US012783602B2

(12) United States Patent
Zhou et al.

(10) Patent No.: US 12,783,602 B2
(45) Date of Patent: Nov. 3, 2026

(54) NOISE DETECTION AND HANDLING IN MIXED MODELS

(71) Applicant: SAS Institute Inc., Cary, NC (US)

(72) Inventors: Wenwen Zhou, Cary, NC (US); Tianlin Wang, Apex, NC (US); Yan Xu, Cary, NC (US); Joshua David Griffin, Harrisburg, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 19/309,254

(22) Filed: Aug. 25, 2025

(65) Prior Publication Data

US 2026/0119607 A1 Apr. 30, 2026

Related U.S. Application Data

(60) Provisional application No. 63/712,119, filed on Oct. 25, 2024.

(51) Int. Cl.
*G06F 17/18* (2006.01)
*G06F 17/12* (2006.01)
*G06N 7/01* (2023.01)

(52) U.S. Cl.
CPC .............. *G06F 17/18* (2013.01); *G06F 17/12* (2013.01); *G06N 7/01* (2023.01)

(58) Field of Classification Search
CPC .......... G06F 17/11; G06F 17/12; G06F 17/18; G06N 7/01
See application file for complete search history.

(56) References Cited

PUBLICATIONS

X. Yue, H. Yan, J. G. Park, Z. Liang and J. Shi, "A Wavelet-Based Penalized Mixed-Effects Decomposition for Multichannel Profile Detection of In-Line Raman Spectroscopy," in IEEE Transactions on Automation Science and Engineering, vol. 15, No. 3, pp. 1258-1271, Jul. 2018 (Year: 2018).*

Yashar Behzadi, Khaled Restom, Joy Liau, Thomas T. Liu, A component based noise correction method (CompCor) for BOLD and perfusion based fMRI, NeuroImage, vol. 37, Issue 1, (Year: 2007).*

(Continued)

*Primary Examiner* — Andrew Caldwell
*Assistant Examiner* — Phat N Le
(74) *Attorney, Agent, or Firm* — Padowithz Alce; Alce PLLC

(57) ABSTRACT

A system and method to detect and reduce noise include receiving a request and deploying a linear mixed model in a plurality of iterations to determine, based on one or more parameters of the linear mixed model, that noise is present in an output of the linear mixed model, determine that the noise is not larger than a threshold and that the output is capable of further improvement, adjust at least some of the one or more parameters to obtain one or more adjusted parameters, adjust the output of the linear mixed model based on the one or more adjusted parameters to reduce the noise in the output, determine whether a stopping criterion is reached, and responsive to determining that the stopping criterion has not reached, repeat next iteration with the adjusted output or responsive to determining that the stopping criterion has reached, transmit the output.

30 Claims, 19 Drawing Sheets

(56) References Cited

PUBLICATIONS

Danni Yu, John Danku, Ivan Baxter, Sungjin Kim, Olena K. Vatamaniuk, David E. Salt, Olga Vitek, Noise reduction in genome-wide perturbation screens using linear mixed-effect models, Bioinformatics, vol. 27, Issue 16, Aug. 2011, pp. 2173-2180 (Year: 2011).*

John L. Hennessy and David A. Patterson. 2011. Computer Architecture, Fifth Edition: A Quantitative Approach (5th. ed.). Morgan Kaufmann Publishers Inc., San Francisco, CA, USA. (Year: 2011).*

Jeffrey Arnold, "An Introduction to Floating-Point Arithmetic and Computation", May 9, 2017 (Year: 2017).*

Stroup, et al., "SAS for Mixed Models: Introduction and Basic Applications," 2018, 42 pages.

J. Nocedal and S. J. Wright, Numerical Optimization, Springer-Verlag, New York, 1999, 684 pages.

SAS Visual Statistics: Procedures, Sep. 2024, Chapter 17, pp. 855-952.

* cited by examiner

500

1000

NOISE DETECTION AND HANDLING IN MIXED MODELS

CROSS-REFERENCE TO RELATED APPLICATIONS

This application is a non-provisional of U.S. provisional application No. 63/712,119, filed on Oct. 25, 2024, the entirety of which is incorporated by reference herein.

BACKGROUND

Linear Mixed Models (LMMs) are statistical models that are useful for solving optimization problems when data includes both fixed and random effects. LMMs are extensions of simple linear models. LMMs are widely used in a variety of applications. In particular, LMMs are versatile models that may be particularly beneficial when data has hierarchical, nested, or repeated measures structures. Example applications may include tracking patient outcomes over time, accounting for variability between patients or hospitals, modeling gene expression data and other types of biomedical or clinical research related applications. LMMs may also be used to analyze participant performance under varying conditions, accounting for subject-level variability, modeling voxel-level data, and other types of psychology and neuroscience related applications. LMMs may also be used in education, agriculture, ecology, economics, social sciences, bioinformatics, genetics, and other applications. However, existing LMMs are limited in their applicability due to the existence of noise during computations.

SUMMARY

In accordance with at least some other aspects of the present disclosure, a system to detect and handle noise is disclosed. The system includes a memory having computer-readable instructions stored thereon; and a distributed computing system comprising: a main machine associated with a first processor; a plurality of worker machines, each associated with a second processor, wherein each of the plurality of worker machines is configured to perform one or more operations under control of the main machine, and wherein the first processor and the second processor execute the computer-readable instructions to: receive, via a user interface of the main machine, a request; and responsive to receiving the request, deploy a linear mixed model in a plurality of iterations to: (A) determine, based on one or more parameters of the linear mixed model, that noise is present in an output of the linear mixed model; (B) responsive to determining that the noise is present in the output of the linear mixed model, determine that the noise is not larger than a threshold and that the output of the linear mixed model is capable of further improvement; (C) responsive to determining that the noise is not larger than the threshold, adjust at least some of the one or more parameters of the linear mixed model to obtain one or more adjusted parameters; (D) adjust the output of the linear mixed model based on the one or more adjusted parameters to handle the noise in the output; (E) determine whether a stopping criterion is reached; and (F) responsive to determining that the stopping criterion has not reached, repeat (A)-(E) with the adjusted output or responsive to determining that the stopping criterion has reached, transmit the output via the user interface of the main machine.

In accordance with at least some aspects of the present disclosure, a non-transitory computer-readable medium having first computer-readable instructions stored thereon is disclosed. The first computer-readable instructions when executed by a first processor associated with a main machine and a second processor associated with each of a plurality of worker machines of a distributed computing system, cause the first processor and the second processor to: receive, via a user interface of the computing system implementing a linear mixed model, a request to solve an optimization problem; and responsive to receiving the request, deploy the linear mixed model to solve the optimization problem in a plurality of iterations by: (A) computing a current value of an objective function, a gradient value of the objective function, and a value of a Hessian matrix; (B) determining that an early exit condition is satisfied, wherein satisfaction of the early exit condition is indicative of noise being present in the objective function; (C) responsive to determining that the early exit condition is satisfied, determining that the noise is not larger than a threshold and that the current value of the objective function is capable of further improvement based on one or more of the gradient value, the value of the Hessian matrix, or the current value of the objective function; (D) setting a flag value responsive to determining that the noise is not larger than the threshold; (E) adjusting the value of the Hessian matrix; (F) computing a search direction for the objective function based on the adjusted value of the Hessian matrix, the gradient value, and a trust region parameter, wherein the search direction is indicative of a direction in which to move the current value of the objective function to improve the current value of the objective function and reduce the impact of the noise; (G) calculating a step size for adjusting the current value of the objective function in the search direction based on the flag value; (H) adjusting the current value of the objective function and the gradient value based on the step size and the search direction; (I) determining whether a stopping criterion is reached; and (J) responsive to determining that the stopping criterion has not reached, repeating (B)-(I) with the adjusted current value of the objective function and the gradient value or responsive to determining that the stopping criterion has reached, outputting an optimized value of the objective function.

In accordance with at least some other aspects of the present disclosure, a system is disclosed. The system includes a memory having computer-readable instructions stored thereon; and a first processor associated with a main machine and a second processor associated with each of a plurality of worker machines of a distributed computing system that execute the computer-readable instructions to: receive, via a user interface of the computing system implementing a linear mixed model, a request to solve an optimization problem; and responsive to receiving the request, deploy the linear mixed model to solve the optimization problem in a plurality of iterations by: (A) computing a current value of an objective function, a gradient value of the objective function, and a value of a Hessian matrix; (B) determining that an early exit condition is satisfied, wherein satisfaction of the early exit condition is indicative of noise being present in the objective function; (C) responsive to determining that the early exit condition is satisfied, determining that the noise is not larger than a threshold and that the current value of the objective function is capable of further improvement based on one or more of the gradient value, the value of the Hessian matrix, or the current value of the objective function; (D) setting a flag value responsive to determining that the noise is not larger than the threshold; (E) adjusting the value of the Hessian matrix; (F) computing a search direction for the objective function based on the adjusted value of the Hessian matrix, the gradient value, and a trust region parameter, wherein the search direction is indicative of a direction in which to move the current value of the objective function to improve the current value of the objective function and reduce the impact of the noise; (G) calculating a step size for adjusting the current value of the objective function in the search direction based on the flag value; (H) adjusting the current value of the objective function and the gradient value based on the step size and the search direction; (I) determining whether a stopping criterion is reached; and (J) responsive to determining that the stopping criterion has not reached, repeating (B)-(I) with the adjusted current value of the objective function and the gradient value or responsive to determining that the stopping criterion has reached, outputting an optimized value of the objective function.

(A) In accordance with at least some other aspects of the present disclosure, a method is disclosed. The method includes receiving, via a user interface of a distributed computing system implementing a linear mixed model, a request to solve an optimization problem, wherein the distributed computing system comprises a memory having computer-readable instructions stored thereon executed by a first processor associated with a main machine and a second processor associated with each of a plurality of worker machines; and responsive to receiving the request, deploying, by the distributed computing system, the linear mixed model to solve the optimization problem in a plurality of iterations by: (A) computing, by distributed computing system, a current value of an objective function, a gradient value of the objective function, and a value of a Hessian matrix; (B) determining, by distributed computing system, that an early exit condition is satisfied, wherein satisfaction of the early exit condition is indicative of noise being present in the objective function; (C) responsive to determining that the early exit condition is satisfied, determining, by distributed computing system, that the noise is not larger than a threshold and that the current value of the objective function is capable of further improvement based on one or more of the gradient value, the value of the Hessian matrix, or the current value of the objective function; (D) setting, by distributed computing system, a flag value responsive to determining that the noise is not larger than the threshold; (E) adjusting, by distributed computing system, the value of the Hessian matrix; (F) computing, by distributed computing system, a search direction for the objective function based on the adjusted value of the Hessian matrix, the gradient value, and a trust region parameter, wherein the search direction is indicative of a direction in which to move the current value of the objective function to improve the current value of the objective function and reduce the impact of the noise; (G) calculating, by distributed computing system, a step size for adjusting the current value of the objective function in the search direction based on the flag value; (H) adjusting, by distributed computing system, the current value of the objective function and the gradient value based on the step size and the search direction; (I) determining, by distributed computing system, whether a stopping criterion is reached; and (J) responsive to determining that the stopping criterion has not reached, repeating, by distributed computing system, (B)-(I) with the adjusted current value of the objective function and the gradient value or responsive to determining that the stopping criterion has reached, outputting, by distributed computing system, an optimized value of the objective function.

The foregoing summary is illustrative only and is not intended to be limiting in any way. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
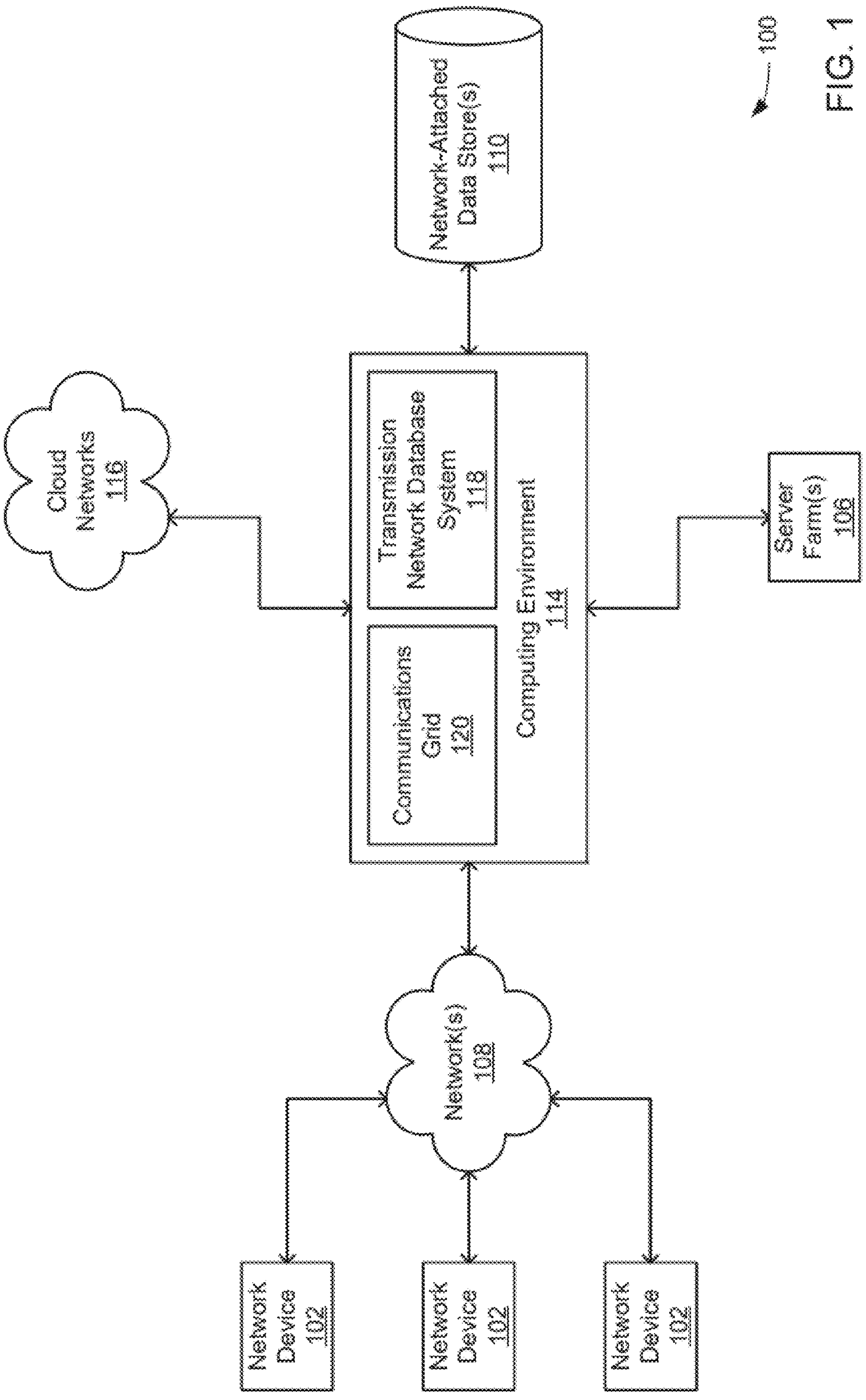
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
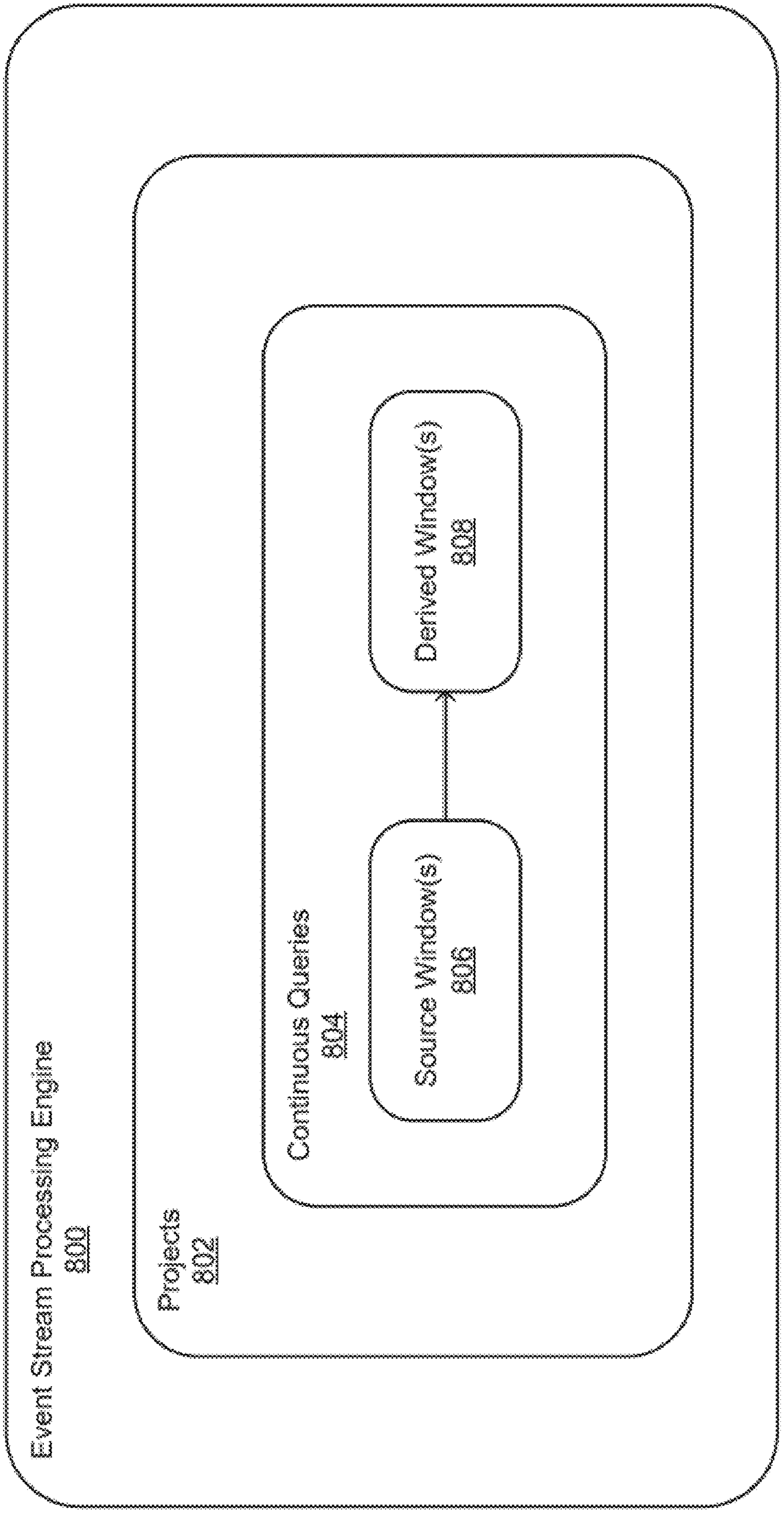
FIG. 8 illustrates a block diagram including components of an Event Stream Processing Engine (ESPE), according to embodiments of the present technology.
Figure 9:
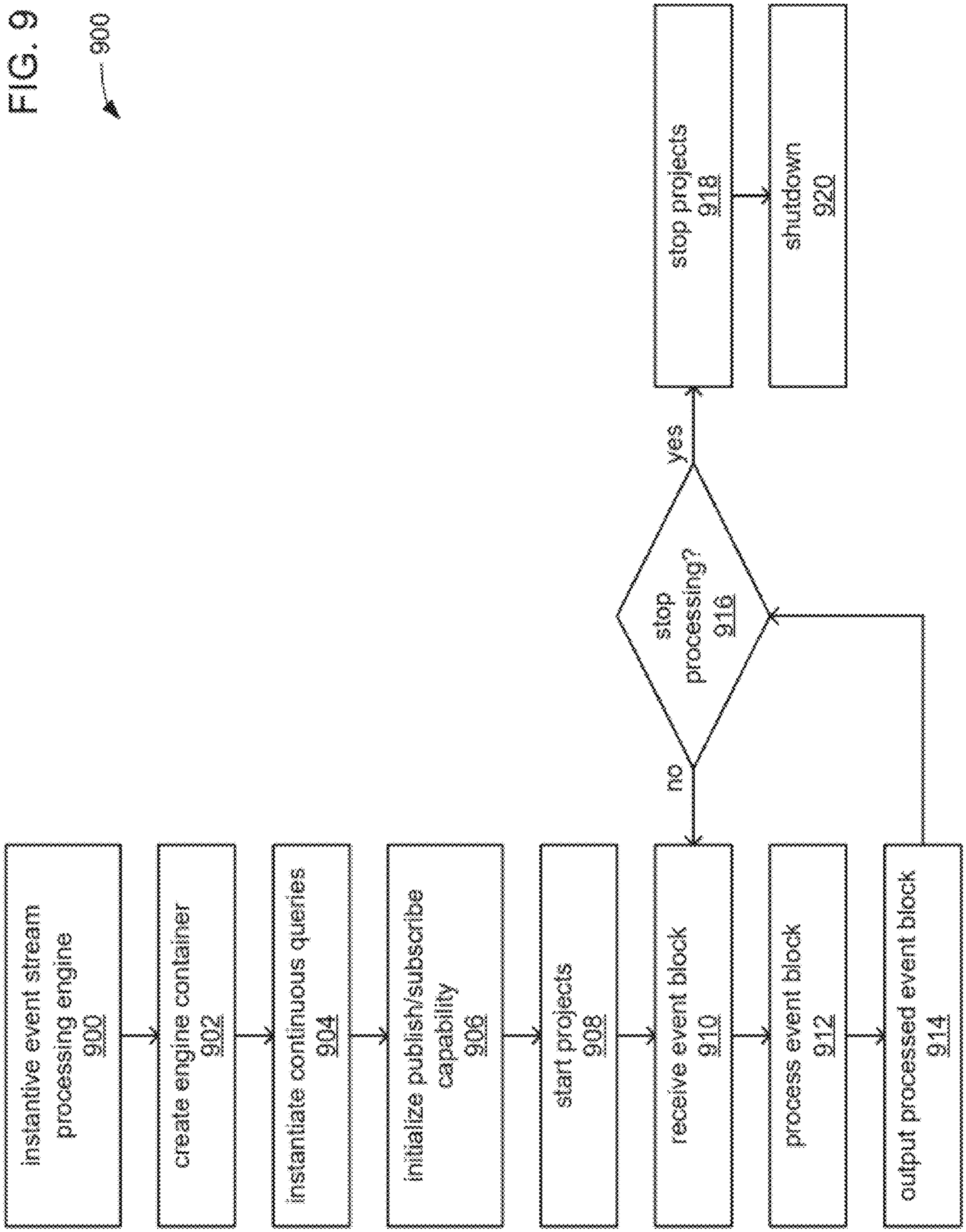
FIG. 9 illustrates a flow chart showing an example process including operations performed by an event stream processing engine, according to some embodiments of the present technology.
Figure 10:
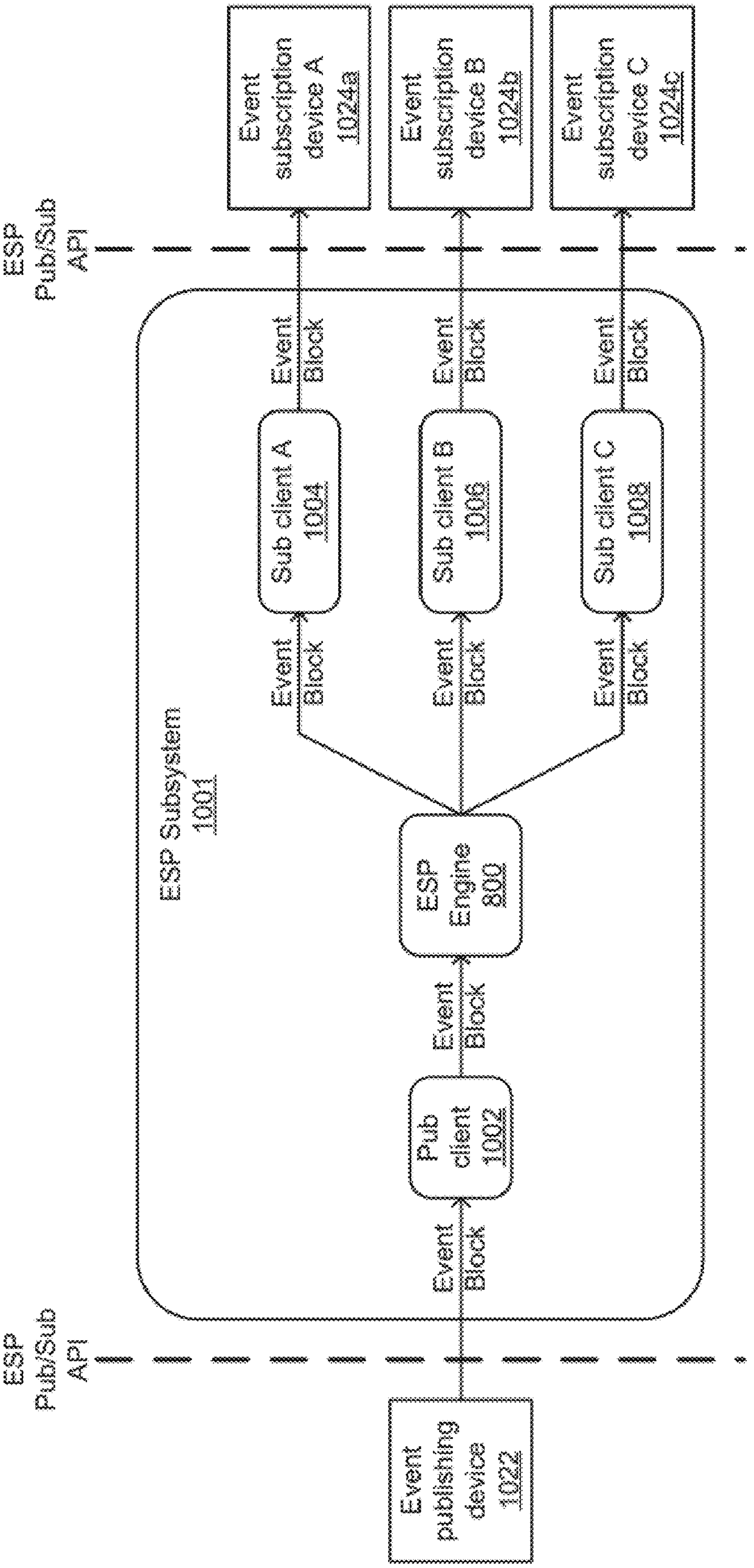
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
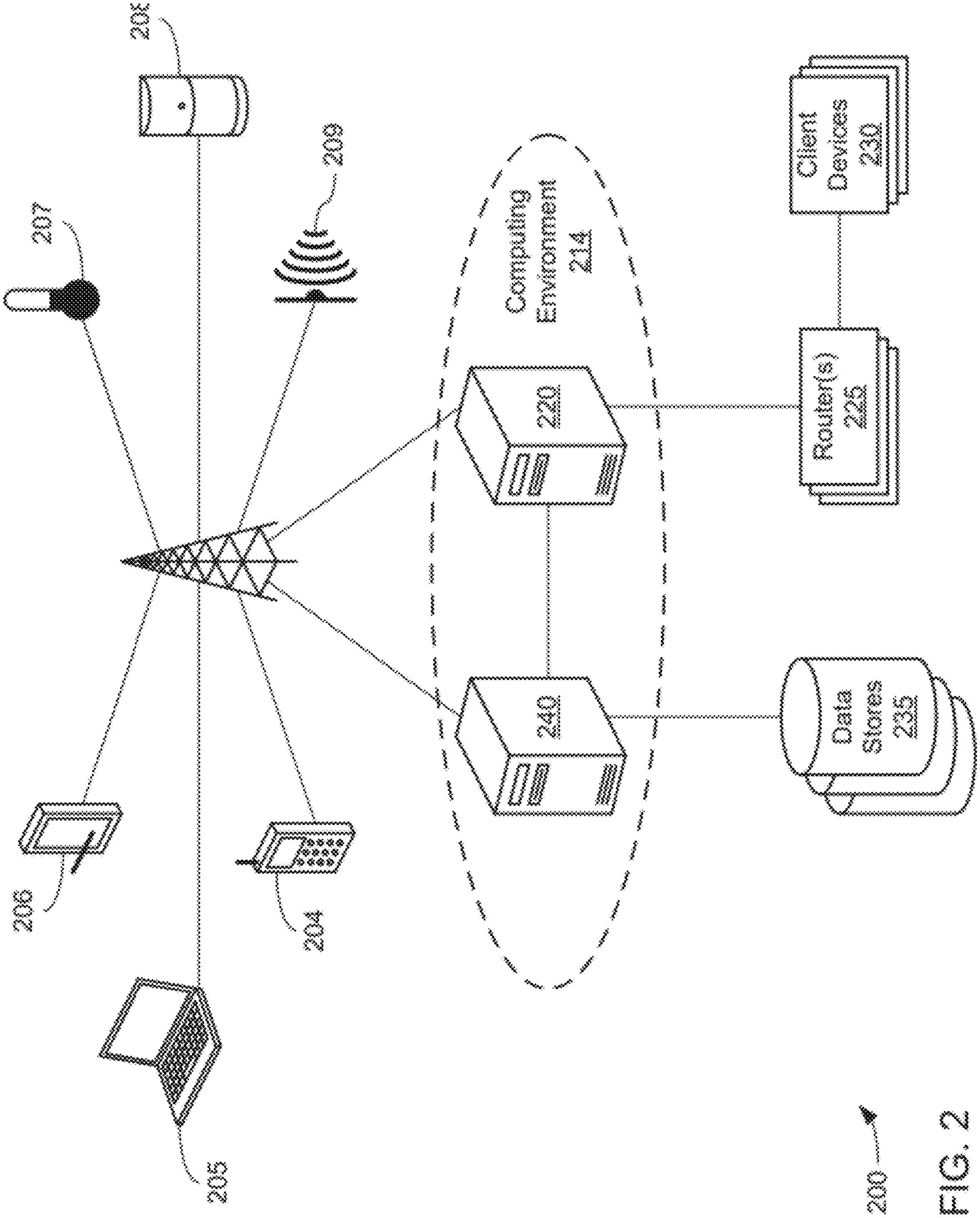
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
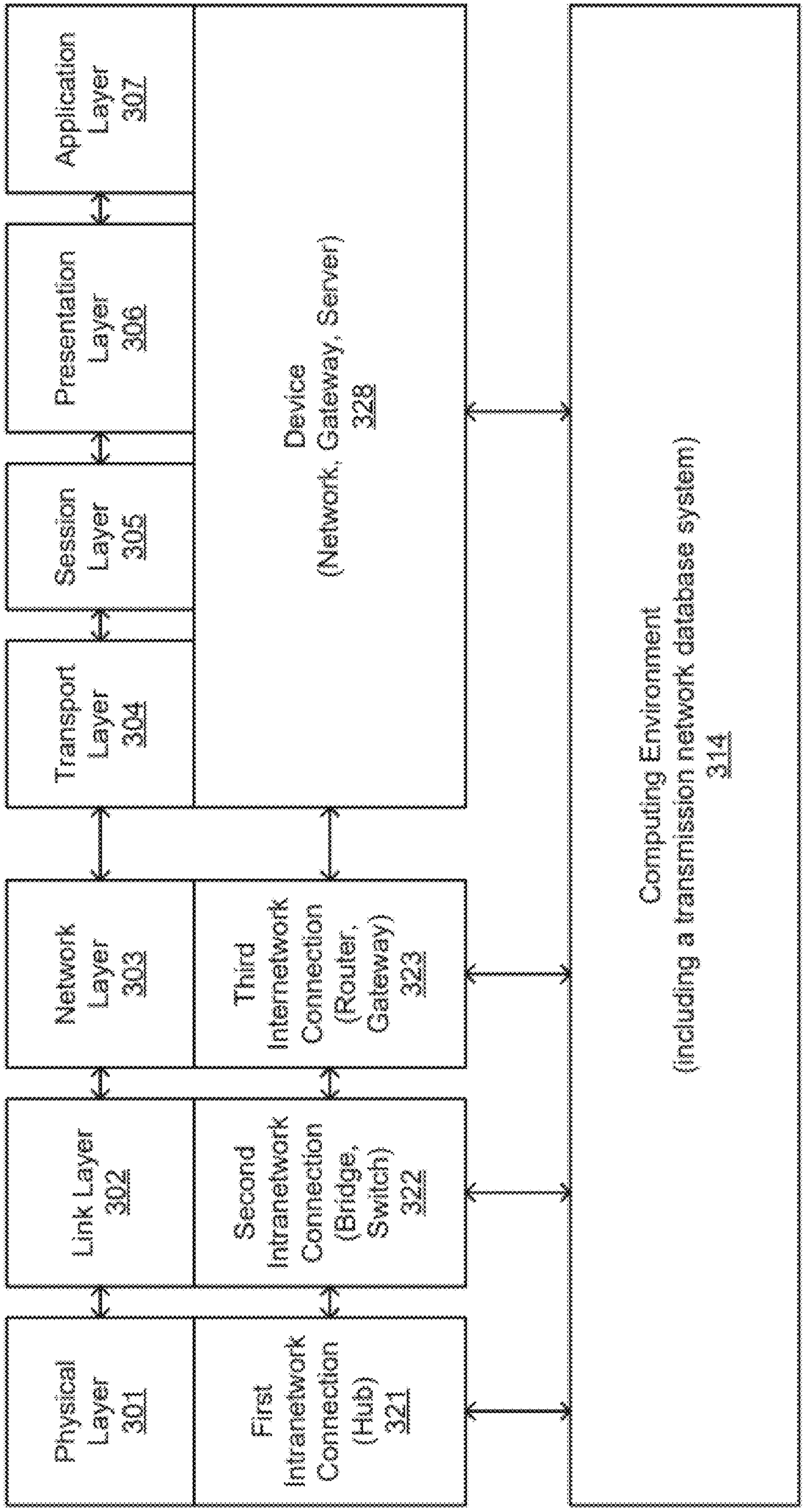
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in the same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network.

In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
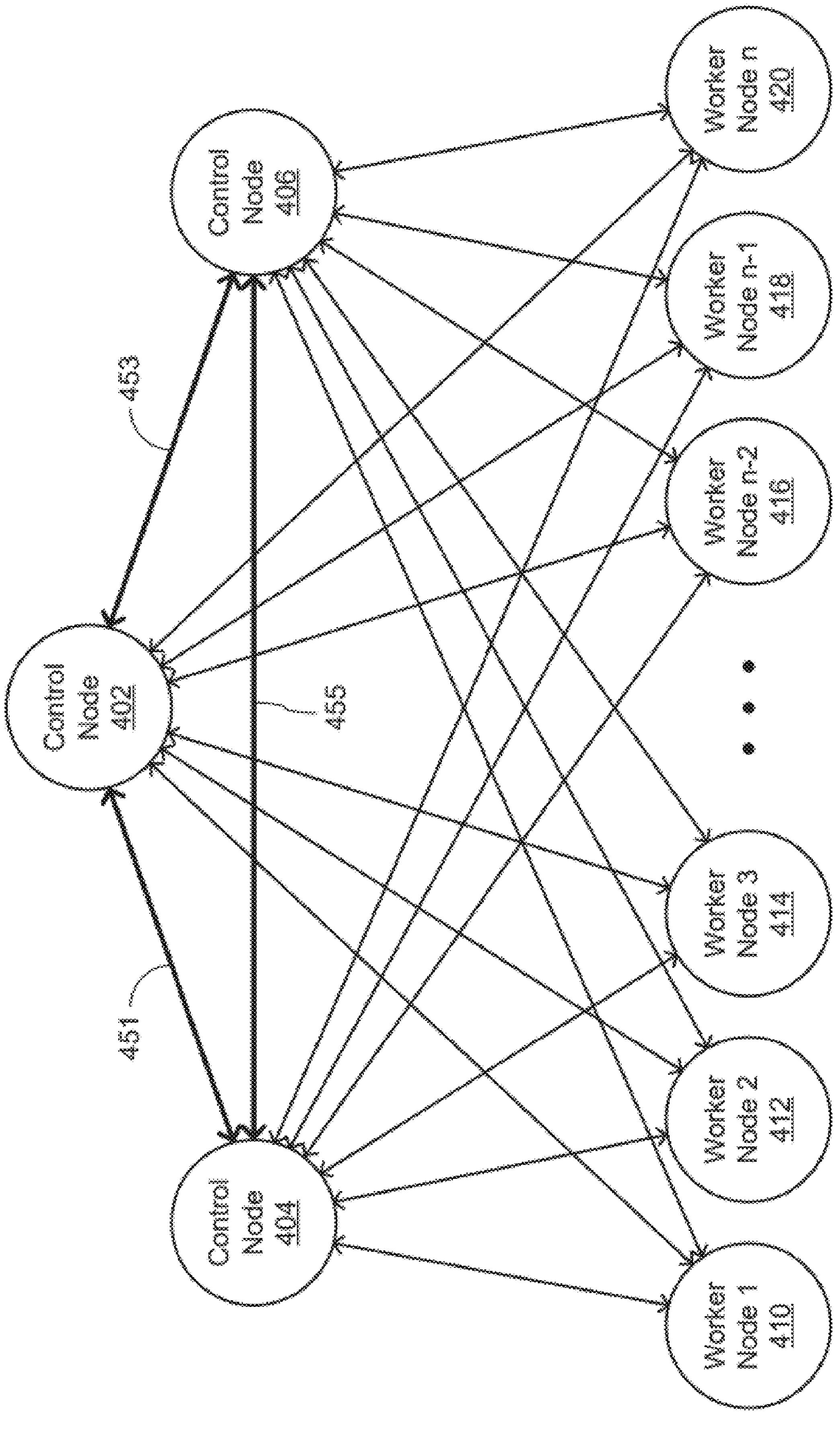
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and restart the project from that checkpoint to minimize lost progress on the project being executed.

Figure 5:
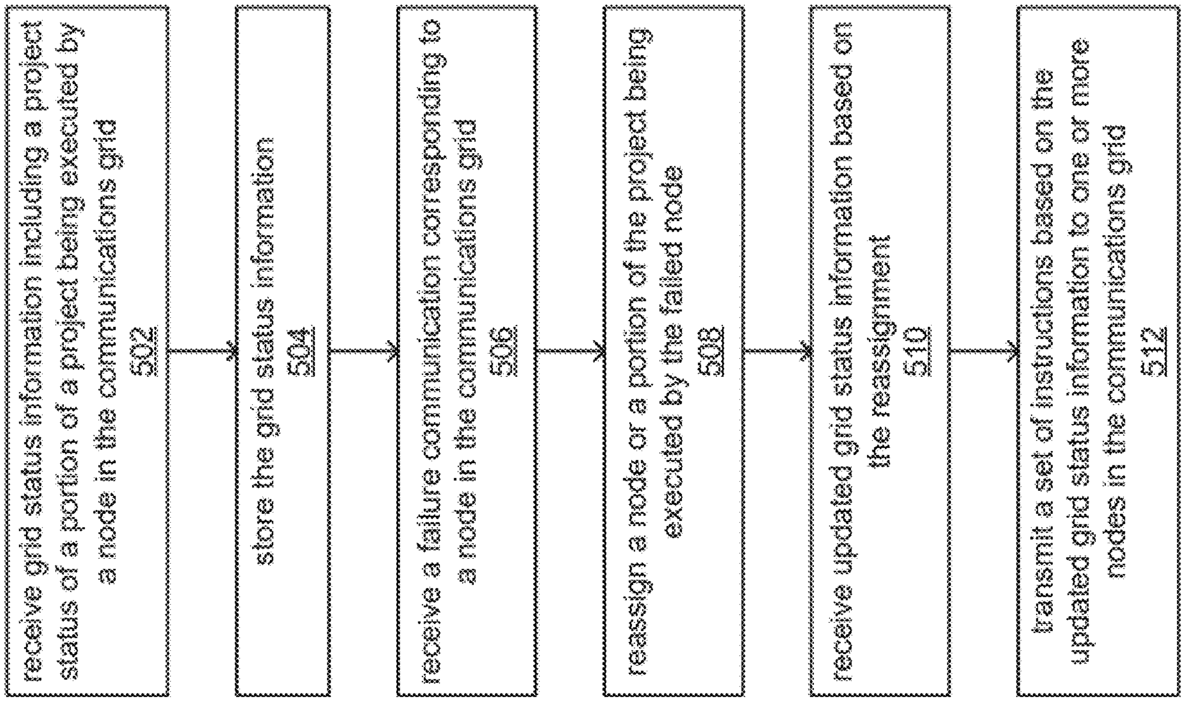
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
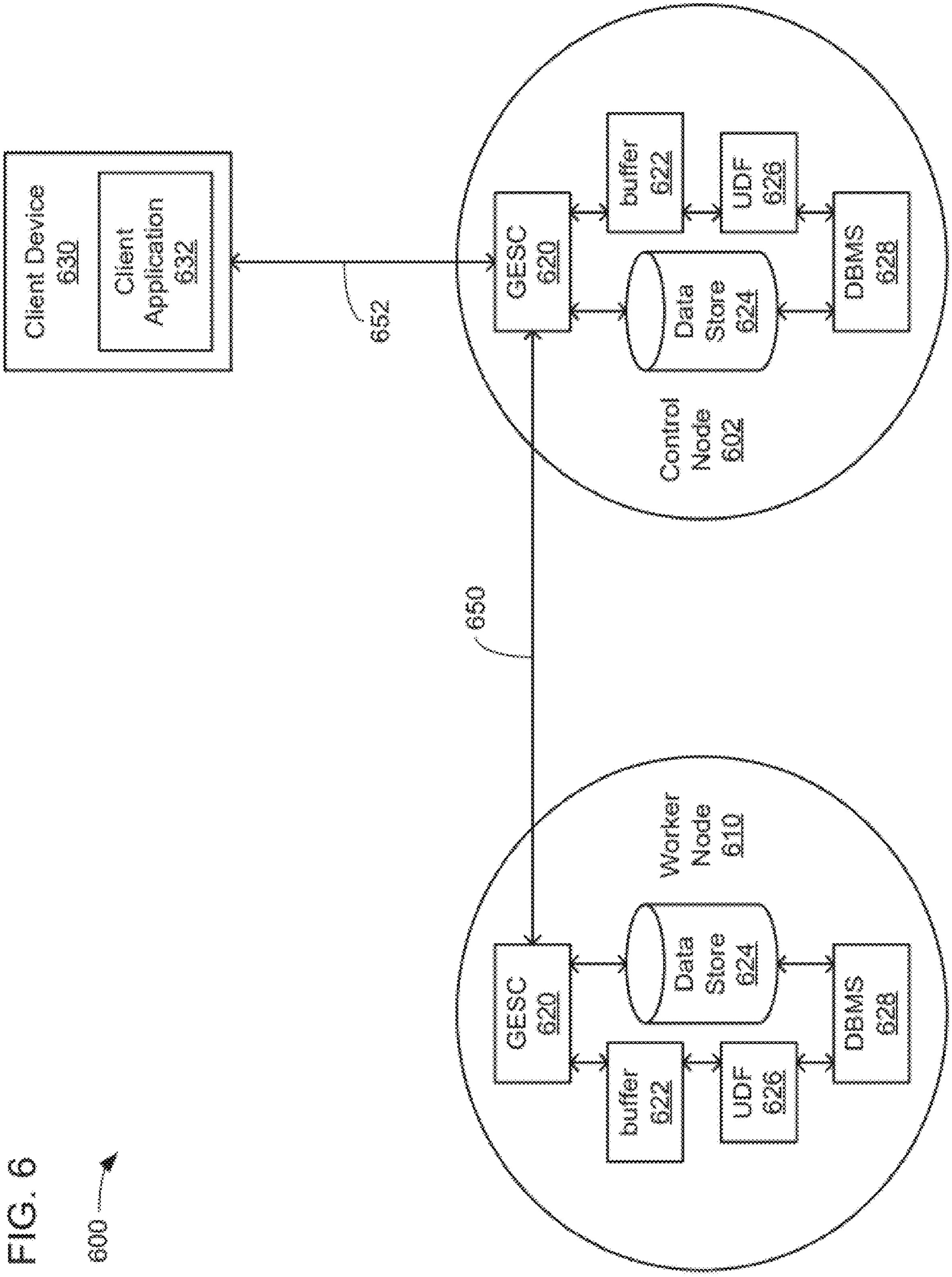
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
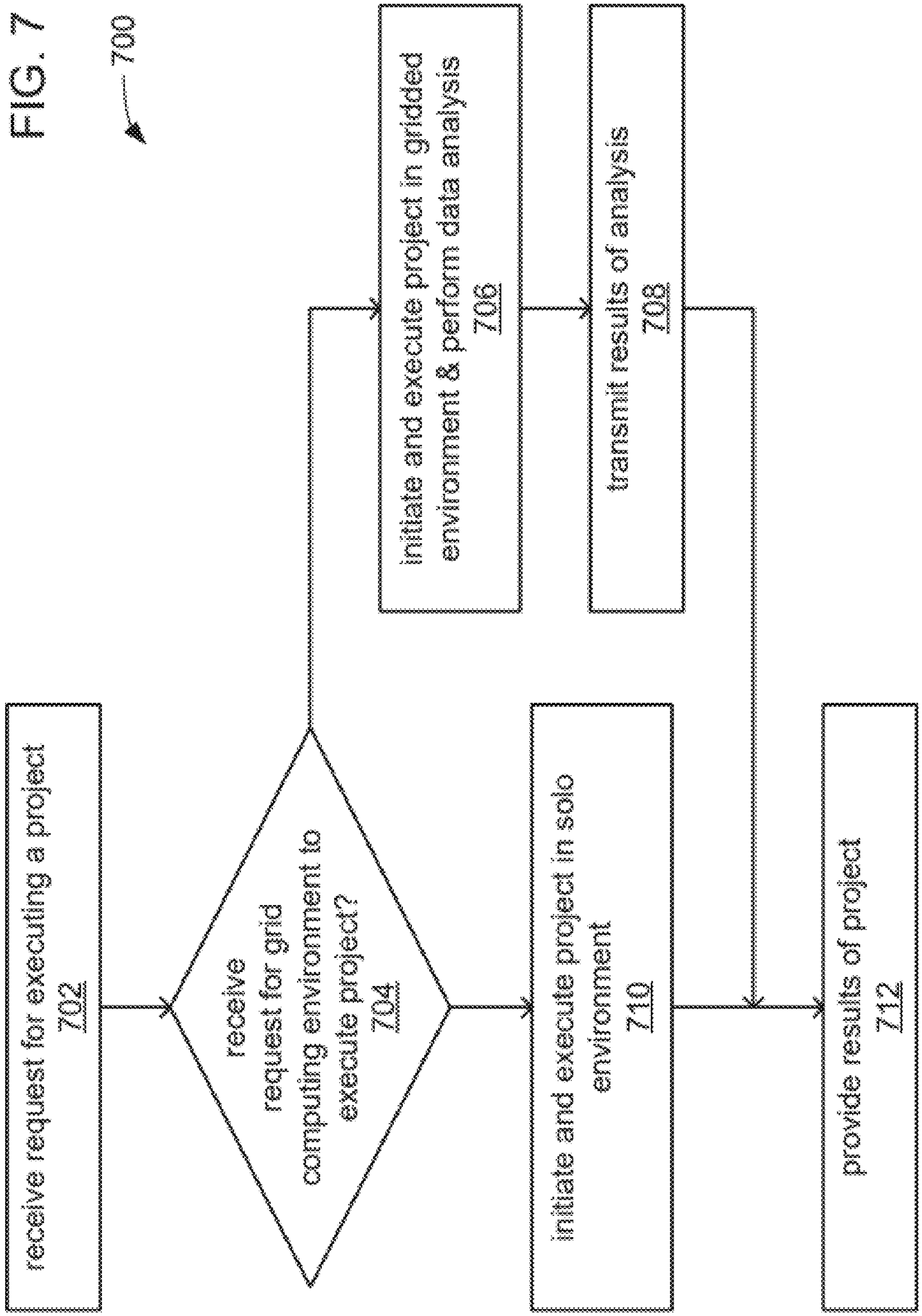
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
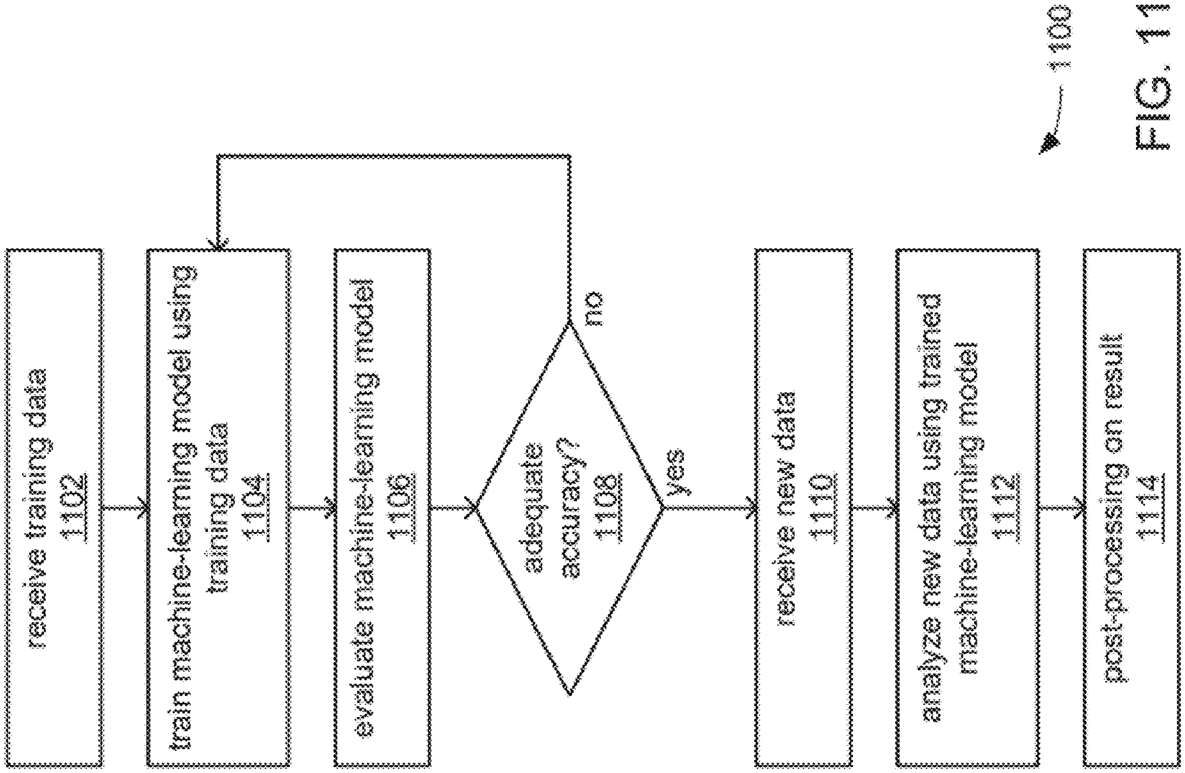
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Other networks may include transformers, large language models (LLMs), and agents for LLMs.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
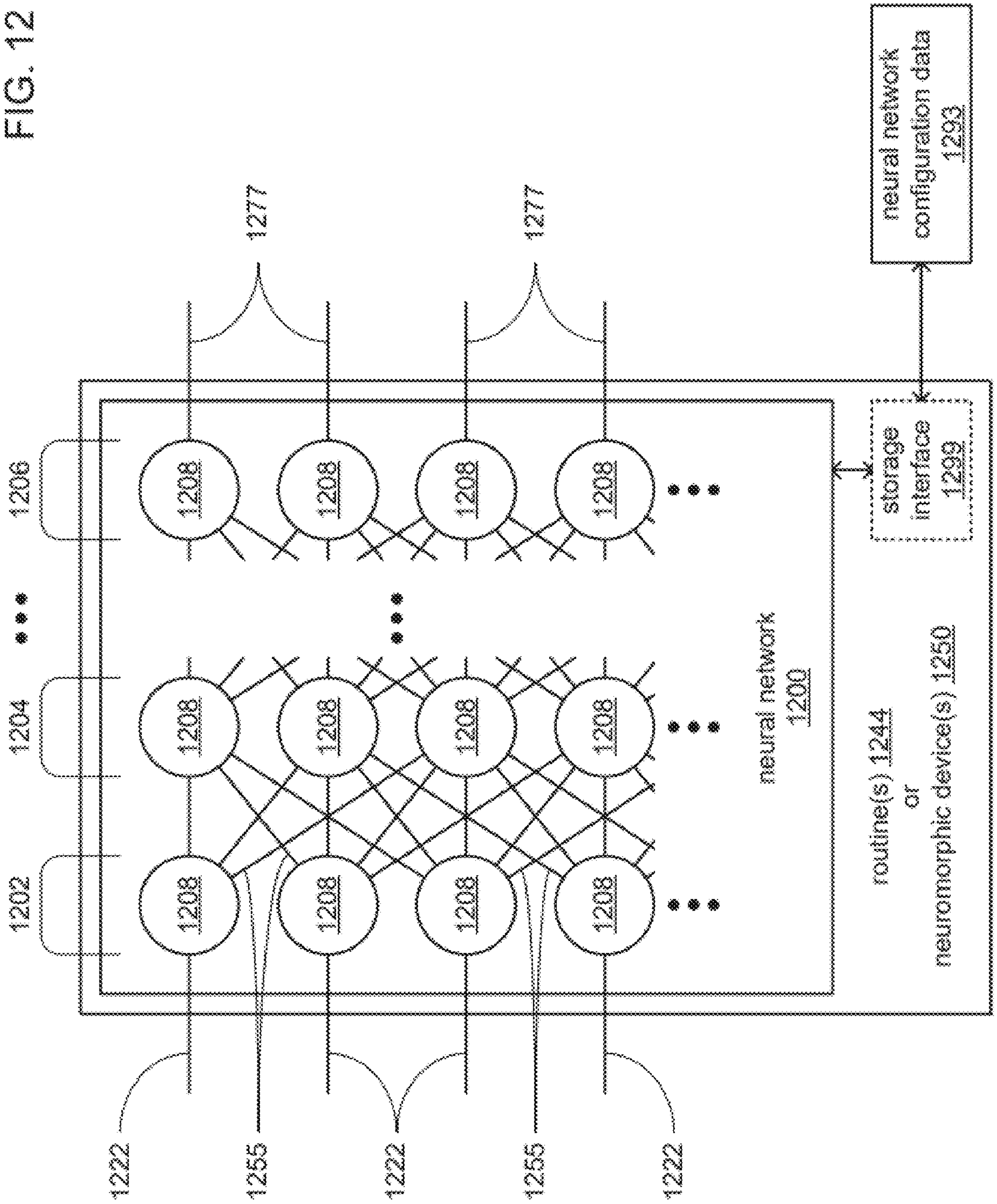
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a “forward” direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a “backward” direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer (“subsequent” in the sense of moving “forward”) of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
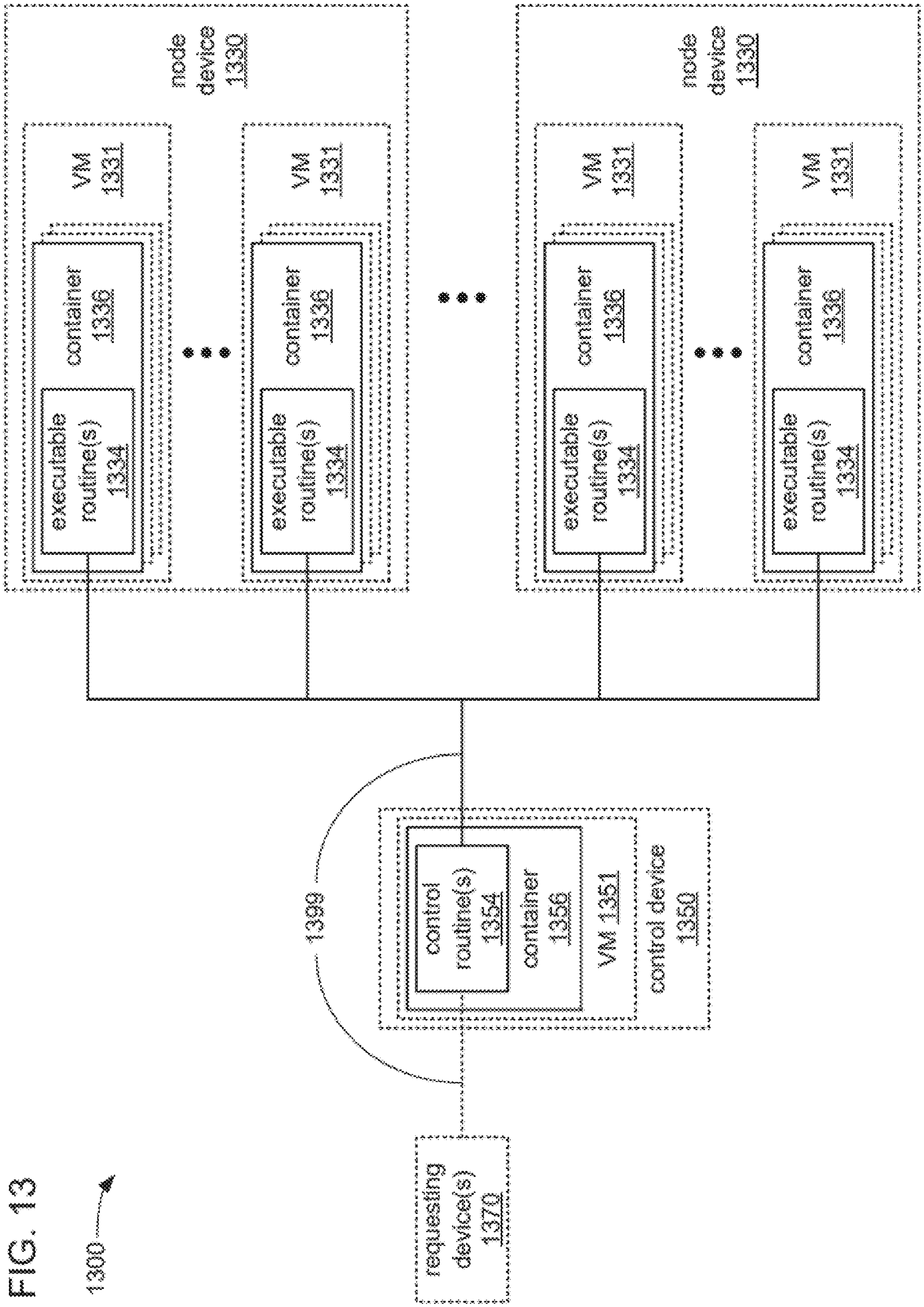
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the afore-described example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Cloud Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

The present disclosure is directed to Linear Mixed Models (LMMs), and particularly to using LMMs for detecting and handling noise when finding optimal solutions to problems (e.g., optimization problems). An optimization problem is a task of finding the best solution (also referred to herein as an optimal solution) from all feasible solutions. An optimization problem may be represented in terms of decision variables and constraints that define an objective function. (e.g., a likelihood function). The objective function may represent or be indicative of an objective or goal (e.g., maximize profit, minimize cost, etc.) that the optimization problem is intended to achieve. The decision variables may be inputs or choices that affect the outcome. The constraints may define rules or conditions that are to be satisfied (e.g., budget limits, number of machines, etc.). The feasible solutions represent the set of all solutions that meet the constraints. The optimal solution may correspond to a minimized or maximized value of the objective function that satisfies all the constraints from the feasible solutions.

LMMs are an extension of simple linear models to allow both fixed and random effects and are widely used in a variety of industries. For example, LMMs may be used in biomedical research to study the effect of a new drug on a disease (e.g., blood pressure), in education to evaluate teaching methods across schools, in psychology to measure reaction time under varying circumstances, in agriculture to study crop yield under different fertilizer treatments, in industrial experiments to test machine performance across factories, in longitudinal studies to track cholesterol levels over time, etc. In general, LMMs may be used in any application where the data has both fixed effects (e.g., consistent parameters across observations) and random effects (e.g., where parameters vary across observations). Variables or parameters corresponding to the fixed effects and the random effects may form the parameter estimates for the LMM. The LMIXED procedure may attempt to determine the optimal values of the parameter estimates for the LMM.

LMIXED is a procedure provided by SAS Institute Inc. of Cary, N.C., USA that is used to fit LMMs within the SAS® Viya® environment, leveraging cloud analytics services engine for scalable, high performance analytics. The LMIXED procedure may be used to estimate fixed and random effects. The LMIXED procedure provides a flexible and powerful framework for analyzing LMMs fitting data with complex structures, such as hierarchical or nested data. The present disclosure may be applicable to the LMIXED procedure, or any other suitable procedure used to fit LMMs.

Using the LMIXED procedure may involve solving the following non-linear optimization problem:

$$\underset{x \in \mathbb{R}^n}{\text{minimize}}\ f(x, y(x)), \text{ subject to } l \leq x \leq u \qquad \text{Equation 1}$$

In Equation 1 above, $f(x, y)$ is a smooth objective function, $y(x)$ is a solution of a linear system, x. l and u are vectors defining lower and upper bounds, respectively, of x, and n is the number of decision variables. In some embodiments, the LMIXED procedure may use a maximum likelihood function or a restricted maximum likelihood function as the objective function to fit the LMMs. Using either the maximum likelihood function or the restricted maximum likelihood function may involve computing a gradient value (e.g., first derivative) that indicates the search direction and rate of change of the maximum likelihood function or the restricted maximum likelihood function and a value of a Hessian matrix (e.g., second derivative) that helps refine the search for optimal parameter values for finding an optimal solution. The Hessian matrix may be a square matrix and may capture curvature information about the maximum likelihood function or the restricted maximum likelihood function. The LMIXED procedure may use the gradient value and the value of the Hessian matrix to compute a search direction. The search direction is a vector that points towards the optimal solution. For example, the search direction may indicate whether to increase or decrease the value of the maximum likelihood function or the restricted maximum likelihood function to move towards the optimal solution. In addition to computing the search direction, the LMIXED procedure may use the gradient value and the value of the objective function to compute a step size, which refers to the magnitude of movement along the search direction. For example, while the search direction may indicate whether to increase or decrease the value of the maximum likelihood function or the restricted maximum likelihood function, the step size may indicate how much to increase or decrease the value of the maximum likelihood function or the restricted maximum likelihood function.

Solving Equation 1 to optimize x may involve noise. Noise may refer to any kind of randomness, uncertainty, or error that impacts the solution of Equation 1. In some embodiments, solving Equation 1 or using matrix decomposition (e.g., sparse matrix techniques in the LMIXED procedure) may introduce noise due to rounding errors from evaluating y(x) by solving a linear system. A rounding error may occur when a number is approximated rather than represented exactly. Rounding errors may introduce noise by adding small, unintended deviations to numerical values during the solving of Equation 1. In some embodiments, Equation 1 may be solved in a plurality of iterations, and the noise from each iteration may accumulate. The noise may impact the convergence of optimization algorithms used in the LMIXED procedure and the accuracy of the solution obtained. Convergence in optimization algorithms may refer to the process by which an optimization algorithm approaches a solution—ideally the optimal solution—over successive iterations. Convergence provides a way of measuring whether the optimization algorithm is making progress and how reliably the algorithm is able to reach a desired outcome.

In general, with each iteration, the optimization algorithm gets closer to the optimal solution. The change in the objective function value, $f(x, y(x))$, between iterations gets closer to the optimal solution with each advancing iteration. In the early iterations, the objective function value may be improved without much impact from the noise. However, as the objective function value approaches the optimal solution in the latter iterations, the optimization algorithm may be unable to make further improvements in the objective function value due to noise. Thus, when noise dominates, further improvements may be stalled, and convergence may not be reached or may be delayed. Accordingly, reducing or minimizing the impact of noise may be critical in achieving convergence or achieving convergence quicker.

Existing LMMs do not detect or address noise. Rather, these LMMs ignore noise. Thus, in existing LMMs, the optimization algorithm is unable to achieve a true optimal solution because convergence cannot be reached or achieves a true optimal solution that is delayed. However, ignoring the noise presents several technical problems. For example, as explained above, the presence of noise may complicate finding an optimal solution to the optimization problem. In some embodiments, the presence of noise may make it harder to identify the true minimum or maximum of an objective function, thereby distorting the objective function and adversely impacting the accuracy of the solution. Noise may also mislead gradient values and/or increase the time to convergence. Even minor noise may cause significant changes in the computed gradient value, thereby distorting the objective function values. In particular, when the noise level is relatively high compared to the magnitude of the objective function values, the noise may dominate the gradient value calculation, leading to inaccurate gradient value estimates. During the latter iterations when the algorithm is close to an optimal solution (e.g., when the gradient value is close to 0), additional improvements in the objective function may not occur. Thus, conventional approaches that ignore the noise do not realize the full potential of LMMs.

Given the adverse impact of noise, the present disclosure provides technical solutions that detect and address the noise in the solving of Equation 1. In particular, the present disclosure provides early exit conditions that measure/detect the noise level and determine if the noise in the solution of Equation 1 dominates. If an early exit condition is satisfied, the proposed approach may compute a finite difference along the search direction to assess if the noise is large enough where no further improvement in the objective function may be expected. If the noise is too large, the optimization process may terminate, thereby reducing unnecessary iterations that are unlikely to improve the solution further. By reducing the unnecessary iterations, the present disclosure allows solving of the optimization problem quicker. Further, by reducing the unnecessary iterations, the present disclosure optimizes the usage of computing resources such as computing power (e.g., CPU time) and memory. If the early exit condition is satisfied (e.g., noise is present) but the noise level is not too large, indicating that further improvements in objective function are possible, the present disclosure provides techniques to address the noise by reducing the impact of noise on the solution of the optimization problem. In particular, to mitigate the impact of noise, the proposed approach regularizes the value of the Hessian matrix to reduce the impact of noise on curvature estimates, ensuring a reliable search direction may be found. The proposed approach also uses a backtracking projected line search that satisfies an Armijo condition when the noise is large to avoid unstable or erratic cubic interpolation. Additionally, the proposed approach uses small initial step sizes for the line search when the noise is large to reduce unnecessary function evaluations and enhance performance.

The LMIXED procedure or any procedure used to fit an LMM may not be practically solved in the human mind or using pen and paper. Real-world applications involve massive datasets including thousands and millions of observations across intricate hierarchical structures. As a non-limiting example, estimating the effects of teaching methods across every school in a country, factoring in different classrooms, different teachers, difference in the number and learning style of students, time trends, etc. may involve a volume of data and interactions that quickly outpace human cognitive capacity. Fitting an LMM may involve advanced numerical methods like sparse matrix decomposition, distributed computations, iterative convergence checks, gradient value computations, computations of values of the Hessian matrix, search direction computations, step size computations, etc. that cannot be practically performed within a computing device within any reasonable amount of time. In fact, complex computing devices may be needed to solve such large-scale optimization programs. However, as the number of variables and constraints increase in the objective function, even conventional LMMs struggle to solve these large-scale optimization problems, partially due to difficulty in handling the complexity resulting from super-linear or exponential increase in the computational effort that is required. A procedure to fit an LMM requires a computer that tracks millions and billions of decimal point values with floating point precision that a human mind cannot comprehend and evaluate. Thus, a human mind lacks the precision and memory needed to execute and implement any procedure to fit an LMM. Many procedures that fit LMMs may use multithreading and parallelism to run computations across multiple processing cores (e.g., central processing units) or a distributed system simultaneously. The human mind is not scalable in the way computing devices are. For similar reasons, these mechanisms cannot be performed on pen and paper.

Further, the proposed approach to detect and address noise during the LMIXED procedure or using any LMM cannot be practically performed in the human mind or performed on pen and paper. As indicated above, real-world applications involve massive datasets including thousands and millions of observations, which may serve as inputs to the LMIXED procedure or LMM. These thousands and millions of observations may involve hundreds or thousands of parameters, which may need to be analyzed for detecting the noise. As also discussed above, finding an optimal solution using the LMIXED procedure or using another LMM may occur in a plurality of iterations, and each iteration may involve noise. A human mind is incapable of quantifying uncertainty (e.g., random effects), simulating distributions, or performing intricate computations, even with a single iteration and a few observations, in any reasonable amount of time. The computations involved in the LMIXED procedure or in any LMM may involve complex floating-point arithmetic, eigenvalue decomposition, estimating model fit statistics, variance components, convergence thresholds, etc., none of which may be reliably executed without a machine. A human mind is not built for high-dimensional, noise-sensitive numerical optimization. The proposed approach of detecting and addressing noise are not observations, evaluations, judgements, or opinions, and therefore, cannot be practically performed in the human mind.

Moreover, the proposed approach to detect and address noise provides a particular solution to a particular problem of presence of noise during optimizations using LMMs. The proposed approach provides a particular way to detect that noise is present, that the output of the LMM may still be improved despite the presence of the noise, and then provides a mechanism to reduce the impact of the noise of the output. Thus, the present disclosure provides technical improvements to the technical field of LMMs or performing optimizations using LMMs.

Figure 14:
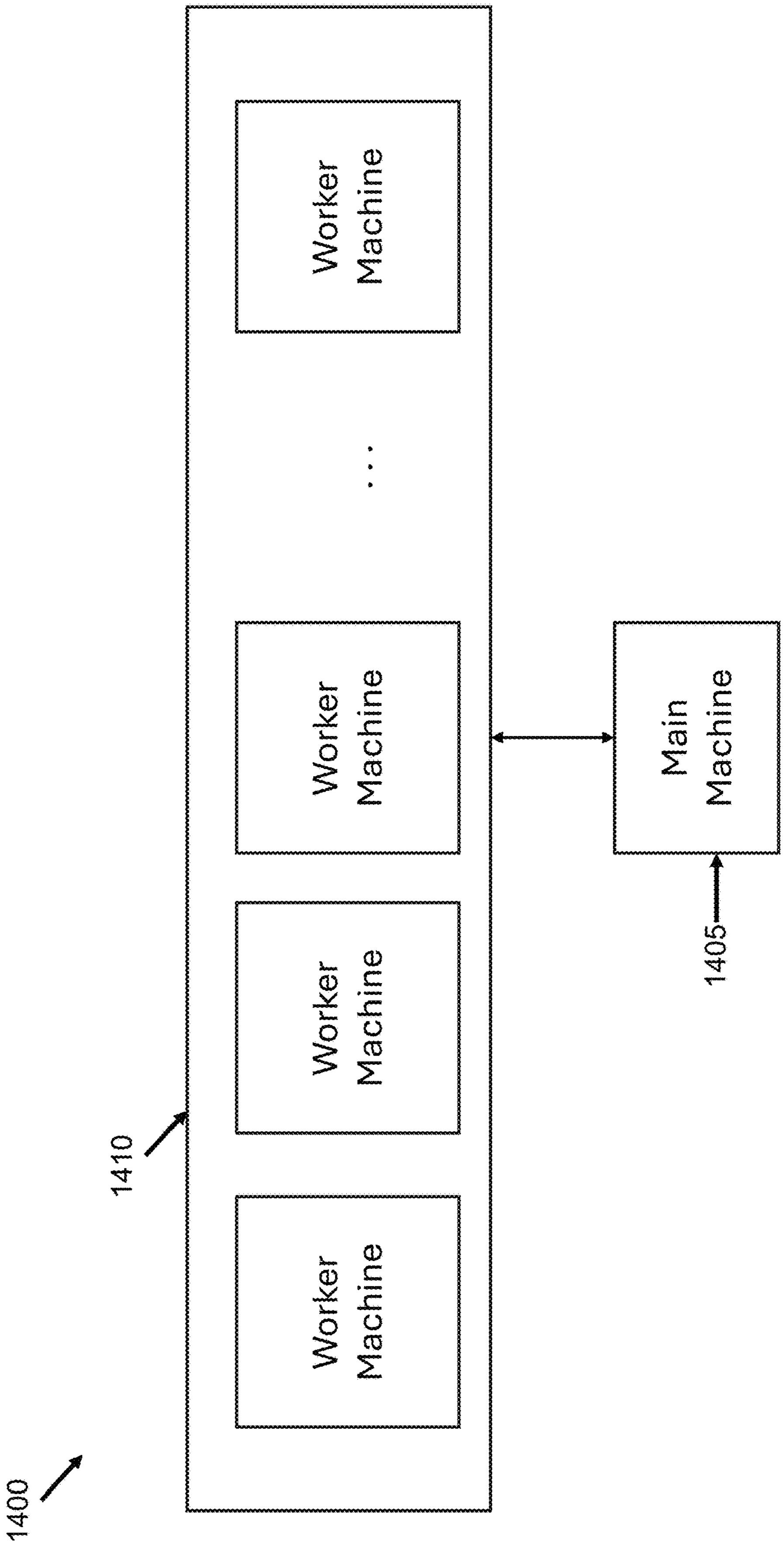
FIG. 14 illustrates a block diagram of an example distributed computing system, according to embodiments of the present technology.

Referring to FIG. 14, an example distributed computing system 1400 is shown, in accordance with some embodiments of the present disclosure. The distributed computing system 1400 provides a distributed architecture for solving optimization problems. The distributed computing system 1400 may include a main machine 1405 communicatively and operatively connected (e.g., via a network) to a plurality of worker machines 1410. The main machine 1405 and each of the plurality of worker machines 1410 may include one or more discrete computing devices or machines. In some embodiments, the main machine 1405 and the plurality of worker machines 1410 may be communicatively and operatively connected via any type of suitable wired or wireless, public or private network, including cellular network, local area network, wide area network such as the Internet or the World Wide Web, Bluetooth®, or any other suitable network.

Figure 15:
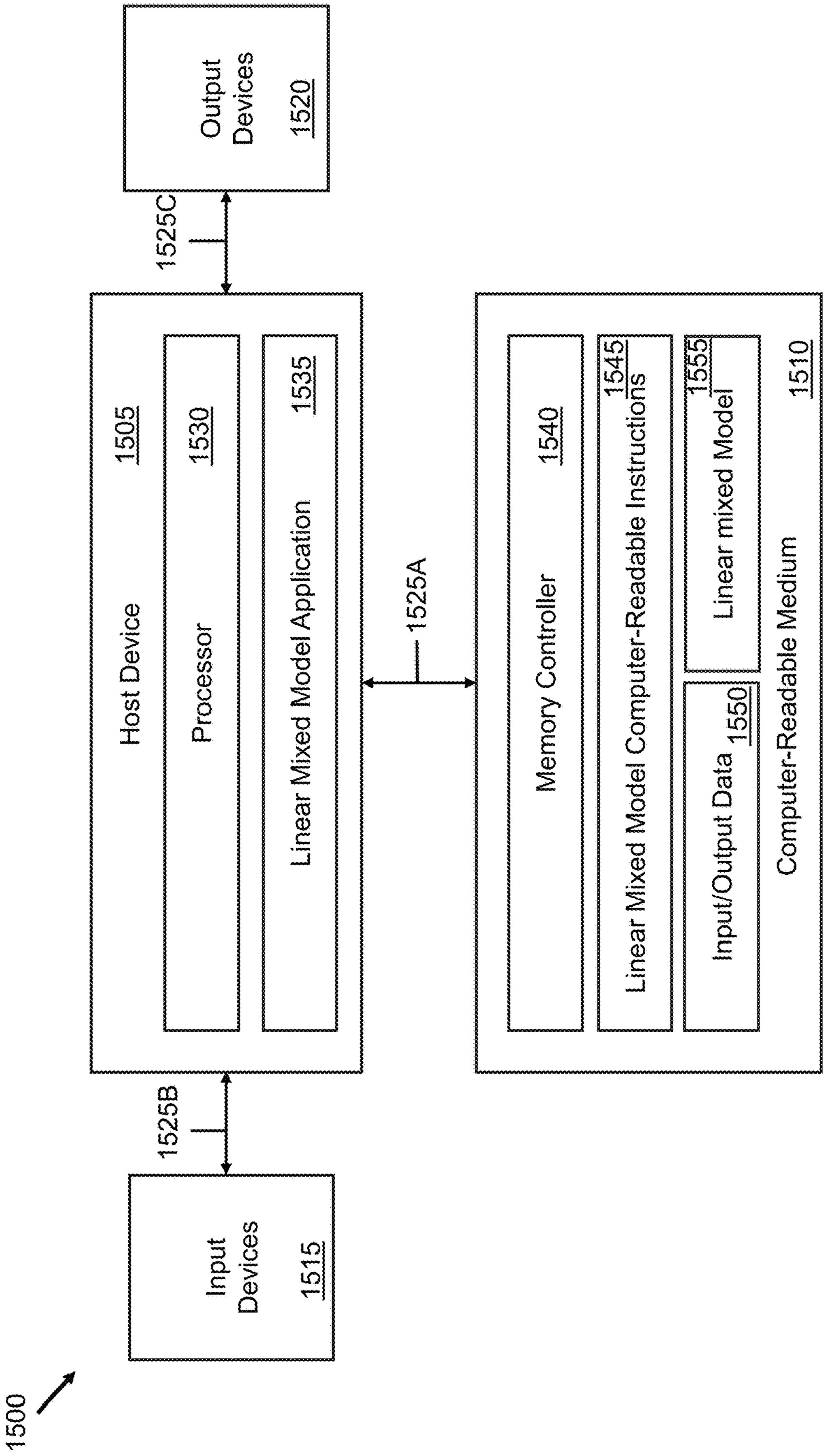
FIG. 15 illustrates a block diagram of an example computing device of the distributed computing system of FIG. 14, according to embodiments of the present technology.

The main machine 1405 and each of the plurality of worker machines 1410 may include computing devices of any form factor such as a desktop, a smart phone, a server computer, a laptop, a personal digital assistant, an integrated messaging device, a tablet computer, or any other suitable computing device. An example of the main machine 1405 and a worker machine of the plurality of worker machines 1410 is shown in FIG. 15. The main machine 1405 may be configured to send data and commands to, as well as receive data and commands from, each of the plurality of worker machines 1410. Each of the plurality of worker machines 1410 may be configured to receive data and commands from, as well as send data and commands to, the main machine 1405. Each of the plurality of worker machines 1410 may also be communicatively and operatively connected to each other. Each of the plurality of worker machines 1410 may be configured to send data and commands to, as well as receive data and commands from, other worker machines. Although four worker machines are shown in FIG. 14, in other embodiments, any number of worker machines may be provided.

Each of the plurality of worker machines 1410 may be similarly or differently configured than other worker machines. For example, in some embodiments, one or more of the plurality of worker machines 1410 may have different amounts of available memory, different types of available memory, different number and types of processing cores, different form factors, etc. Further, in some embodiments, one or more of the plurality of worker machines 1410 may be remotely located (e.g., in different geographic locations) from other worker machines and/or from the main machine 1405. In some embodiments, the main machine 1405 may be similarly or differently configured than the plurality of worker machines 1410. The distributed computing system 1400 is easily scalable. For example, an additional number of worker machines may be added to the plurality of worker machines 1410 to further distribute the computing operations. The main machine 1405 may serve as a controller that controls which operations each of the plurality of worker machines 1410 perform and when. By virtue of distributing computations, each worker machine of the plurality of worker machine may be a commodity computer which together may perform complex and computationally intensive operations in a relatively small amount of time. Further, by distributing computing, the hardware burden on any one of the plurality of worker machines 1410 may be reduced and computing bottlenecks may be avoided.

Thus, the distributed computing system 1400 includes at least the main machine 1405 and the plurality of worker machines 1410. In some embodiments, the main machine 1405 may be associated with a first processor. In some embodiments, the plurality of worker machines 1410 may each be associated with a second processor. In some embodiments, each of the plurality of worker machines 1410 may be configured to perform one or more operations under control of the main machine 1405. For example, in some embodiments, the distributed computing system 1400, and particularly, the main machine 1405 and the plurality of worker machines 1410, may be configured to execute computer-readable instructions to detect and handle noise in mixed models, as described herein.

Turning now to FIG. 15, a block diagram of an example optimization system 1500 is shown, in accordance with some embodiments of the present disclosure. The optimization system 1500 may be part of, or otherwise associated with, the computing environment 114. The optimization system 1500 includes a host device 1505 associated with a computer-readable medium 1510. The host device 1505 may be configured to receive input from one or more input devices 1515 and provide output to one or more output devices 1520. The host device 1505 may be configured to communicate with the computer-readable medium 1510, the input devices 1515, and the output devices 1520 via appropriate communication interfaces, buses, or channels 1525A, 1525B, and 1525C, respectively. The optimization system 1500 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the host device 1505.

Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the optimization system 1500) may be implemented by multiple computing devices in a distributed environment, and vice versa.

The input devices 1515 may include any of a variety of input technologies such as a keyboard, stylus, touch screen, mouse, track ball, keypad, microphone, voice recognition, motion recognition, remote controllers, input ports, one or more buttons, dials, joysticks, point of sale/service devices, card readers, chip readers, and any other input peripheral that is associated with the host device 1505 and that allows an external source, such as a user, to enter information (e.g., data) into the host device and send instructions to the host device 1505. Similarly, the output devices 1520 may include a variety of output technologies such as external memories, printers, speakers, displays, microphones, light emitting diodes, headphones, plotters, speech generating devices, video devices, and any other output peripherals that are configured to receive information (e.g., data) from the host device 1505. The "data" that is either input into the host device 1505 and/or output from the host device may include any of a variety of textual data, numerical data, alphanumerical data, graphical data, video data, sound data, position data, combinations thereof, or other types of analog and/or digital data that is suitable for processing using the optimization system 1500.

The host device 1505 may include a processor 1530 that may be configured to execute instructions for running one or more applications associated with the host device 1505. In some embodiments, the instructions and data needed to run the one or more applications may be stored within the computer-readable medium 1510. The host device 1505 may also be configured to store the results of running the one or more applications within the computer-readable medium 1510 and/or transmit those results to the output devices 1520. One such application on the host device 1505 may be a linear mixed model application 1535. The linear mixed model application 1535 may be used to solve an optimization problem. Depending on whether the optimization system 1500 is part of the main machine 1405 or the plurality of worker machines 1410, the linear mixed model application 1535 may be configured to perform different computations for solving the optimization problem. In some embodiments, when the optimization system 1500 is part of the main machine 1405, the processor 1530 may be a first processor. In some embodiments, when the optimization system 1500 is part of a worker machine of the plurality of worker machines 1410, the processor 1530 may be a second processor.

The linear mixed model application 1535 may be executed by the processor 1530. The instructions to execute the linear mixed model application 1535 may be stored within the computer-readable medium 1510. To facilitate communication between the host device 1505 and the computer-readable medium 1510, the computer-readable medium may include or be associated with a memory controller 1540. Although the memory controller 1540 is shown as being part of the computer-readable medium 1510, in some embodiments, the memory controller may instead be part of the host device 1505 or another element of the optimization system 1500 and operatively associated with the computer-readable medium 1510. The memory controller 1540 may be configured as a logical block or circuitry that receives instructions from the host device 1505 and performs operations in accordance with those instructions. For example, to execute the linear mixed model application 1535, the host device 1505 may send a request to the memory controller 1540. The memory controller 1540 may read the instructions associated with the linear mixed model application 1535. For example, the memory controller 1540 may read linear mixed model computer-readable instructions 1545 stored within the computer-readable medium 1510 and send those instructions back to the host device 1505. In some embodiments, those instructions may be temporarily stored within a memory on the host device 1505. The processor 1530 may then execute those instructions by performing one or more operations called for by those instructions.

For example, in some embodiments, the first processor and the second processor may execute the computer-readable instructions (e.g., the linear mixed model computer-readable instructions 1545) to detect and handle noise in mixed models, as described herein. In some embodiments, the first processor and/or the second processor may receive, via a user interface of the main machine 1405, a request. Responsive to receiving the request, the first processor and/or the second processor may deploy a linear mixed model in a plurality of iterations to (A) determine, based on one or more parameters of the linear mixed model, that noise is present in an output of the linear mixed model, (B) responsive to determining that the noise is present in the output of the linear mixed model, determine that the noise is not larger than a threshold and that the output of the linear mixed model is capable of further improvement, (C) responsive to determining that the noise is not larger than the threshold, adjust at least some of the one or more parameters of the linear mixed model to obtain one or more adjusted parameters, (D) adjust the output of the linear mixed model based on the one or more adjusted parameters to handle the noise in the output, (E) determine whether a stopping criterion is reached, and (F) responsive to determining that the stopping criterion has not reached, repeat (A)-(E) with the adjusted output or responsive to determining that the stopping criterion has reached, transmit the output via the user interface of the main machine.

The computer-readable medium 1510 may include one or more memory circuits. The memory circuits may be any of a variety of memory types, including a variety of volatile memories, non-volatile memories, or a combination thereof. For example, in some embodiments, one or more of the memory circuits or portions thereof may include NAND flash memory cores. In other embodiments, one or more of the memory circuits or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the computer-readable medium 1510. In some embodiments, one or more of the memory circuits or portions thereof may be configured as other types of storage class memory ("SCM"). Generally speaking, the memory circuits may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

The computer-readable medium 1510 may also be configured to store input data and/or output data 1550. When the optimization system 1500 is implemented in the main machine 1405, the input data and/or output data 1550 may include data associated with the optimization problem to be solved by the linear mixed model application 1535. The input data and/or output data 1550, when the optimization system 1500 is implemented in the main machine 1405, may also include one or more variables, results computed by the main machine, and/or results computed by the plurality of worker machines 1410. In some embodiments, the input data and/or output data 1550 may include data (e.g., description) associated with linear mixed model 1555, and any other data that is received or sent by the main machine during solving of the optimization problem. When the optimization system 1500 is implemented in the plurality of worker machines 1410, the input data and/or output data 1550 may include data that is received, computed, and/or sent by those worker machines.

It is to be understood that only some components of the optimization system 1500 are shown and described in FIG. 15. However, the optimization system 1500 may include other components such as various batteries and power sources, networking interfaces, routers, switches, external memory systems, controllers, etc. Generally speaking, the optimization system 1500 may include any of a variety of hardware, software, and/or firmware components that are needed or considered desirable in performing the functions described herein. Similarly, the host device 1505, the input devices 1515, the output devices 1520, and the computer-readable medium 1510, including the memory controller 1540, may include hardware, software, and/or firmware components that are considered necessary or desirable in performing the functions described herein.

Figure 16:
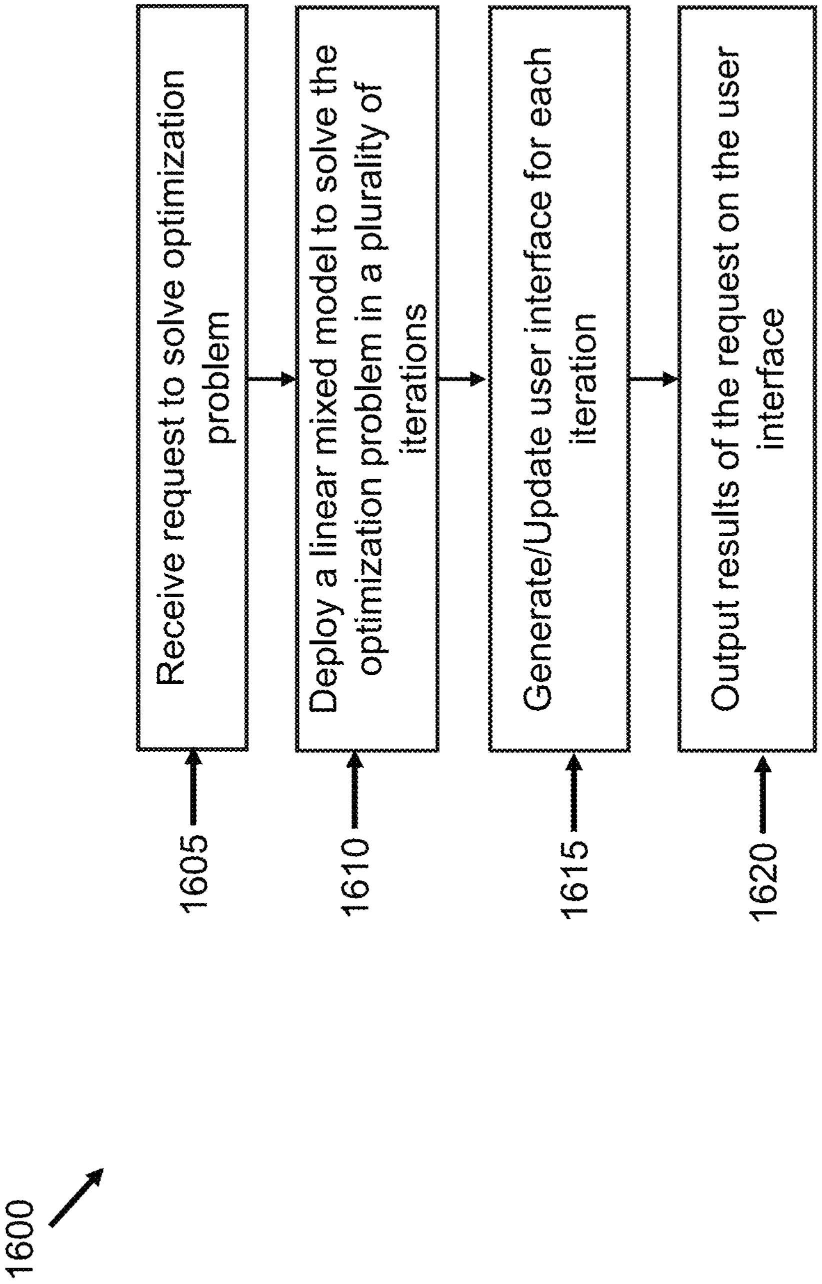
FIG. 16 illustrates a flowchart showing an example process performed by the distributed computing system of FIGS. 14 and 15 for solving an optimization problem using a linear mixed model, according to embodiments of the present technology.

Turning now to FIG. 16, an example flowchart outlining operations of a process 1600 is shown, in accordance with some embodiments of the present disclosure. The process 1600 may be used to solve an optimization problem. The operations of the process 1600 may be performed on the main machine 1405 and/or the plurality of worker machines 1410. The process 1600 may be executed by one or more processors (e.g., the processor 1530) associated with the linear mixed model application 1535 on the main machine 1405 and/or the plurality of worker machines 1410. For example, certain operations of the process 1600 may be performed by a first processor (e.g., the processor 1530) of the main machine and certain operations of the process 1600 may be performed by a second processor (e.g., the processor 1530) of each of the plurality of worker machines 1410. One or more processors (e.g., the first processor and/or the second processor) may execute computer-readable instructions (e.g., the linear mixed model computer-readable instructions 1545) to solve the optimization problem. For simplicity of explanation, the process 1600 is described as being executed by a processor instead of the first processor or the second processor. The process 1600 may include other or additional operations depending upon the embodiment.

At operation 1605, the processor receives, via a user interface (e.g., input devices 1515, the output devices 1520) of the optimization system 1500 implementing the linear mixed model 1555, a request to solve an optimization problem. In some embodiments, the request may include (e.g., identify the location of) the statement of the procedure (e.g., LMIXED) and any model statements to be invoked for the process 1600. In some embodiments, the model statements may identify the dependent variables, fixed variables, and any other information that may be needed to implement the process 1600. In some embodiments, the request may include other or additional information or statements. In some embodiments, the first processor may present one or more user interface windows, which may include one or more menus and/or selectors such as drop-down menus, buttons, text boxes, hyperlinks, etc. associated with the linear mixed model application 1535 to receive the request. The one or more menus and/or selectors may be accessed in various orders. An indicator may indicate one or more user selections from such one or more user interface windows, one or more data entries into a data field of the one or more user interface windows, one or more data items read from a command line, one or more data items read from a computer-readable medium (e.g., the computer-readable medium 1510), and/or one or more data items otherwise defined with one or more default values, etc. that are received as an input by the linear mixed model application 1535.

In some embodiments, to solve the optimization problem, the processor may receive the input data (e.g., the input data 1550) as part of the request. In some embodiments, the input data 1550 may include a plurality of observations. In some embodiments, the plurality of observations may include fixed effect variables indicative of parameters that are consistent across the observations and random effect variables indicative of parameters that may vary across observations. In some embodiments, the input data 1550 may also include value(s) of a response variable indicative of the outcome being modeled, a covariance structure information to specify how fixed or random effect variables are correlated, and any other information that may be needed or considered suitable to have in finding an optimal solution to the optimization problem. In some embodiments, the fixed effect variables and the random effect variables may constitute decision variables. In some embodiments, the plurality of observations may be arranged in a matrix form, with one row for each observation and each column of each row directed to one variable. In some embodiments, the input data 1550 may include data captured as a function of time. For example, in some embodiments, the input data 1550 may be captured at different time points, periodically, intermittently, when an event occurs, etc. In some embodiments, the input data 1550 may include data captured at a high data rate such as 200 or more data values per second or other suitable rates. In some embodiments, the input data 1550 may be a collection of data (e.g., images, text files, emails, etc.) in one or more formats. In some embodiments, the input data 1550 may include data captured under normal and abnormal operating conditions. Further, in some embodiments, the input data 1550 may be received directly or indirectly from the source and may or may not be pre-processed in some manner. For example, in some embodiments, the input data 1550 may be pre-processed using an event stream processor such as the SAS® Event Stream Processing Engine (ESPE), developed and provided by SAS Institute Inc. of Cary, N.C., USA. For example, in some embodiments, the input data 1550 may be generated as part of the Internet of Things (IoT), where things (e.g., machines, devices, phones, sensors) may be connected to networks and the data from these things collected and processed within the things and/or external to the things. In some embodiments, the input data 1550 may reside in the cloud or in an edge device. In some embodiments, the input data 1550 may be streaming data. In some embodiments, the input data 1550 may be non-streaming data.

In some embodiments, the input data 1500 may include any type of content represented in any computer-readable format such as binary, alphanumeric, numeric, string, markup language, etc. The content may include textual information, numeric information, etc. that further may be encoded using various encoding techniques as understood by a person of skill in the art. The input data 1550 may be stored in various compressed formats such as a coordinate format, a compressed sparse column format, a compressed sparse row format, etc. The input data 1550 may be organized using delimited fields, such as comma or space separated fields, fixed width fields, using a SAS® dataset, etc. The SAS® dataset may be a SAS® file stored in a SAS® library that a SAS® software tool creates and processes. In some embodiments, the input data 1550 may be stored using various data structures including one or more files of a file system, a relational database, one or more tables of a system of tables, a structured query language database, etc.

In some embodiments, all of the input data 1550 may be stored in one location. In other embodiments, the input data 1550 may be distributed across multiple locations. For example, the input data 1550 may be stored in a cube distributed across a grid of computers. As another example, the input data 1550 may be stored in a multi-node Hadoop® class. For instance, Apache™ Hadoop® is an open-source software framework for distributed computing supported by the Apache Software Foundation. As another example, the input data 1550 may be stored in a cloud of computers and accessed using cloud computing technologies, as understood by a person of skill in the art. The SAS® LASR™ Analytic Server may be used as an analytic platform to enable multiple users to concurrently access data stored in the training data. The SAS® Viya® open, cloud-ready, in-memory architecture also may be used as an analytic platform to enable multiple users to concurrently access data stored in the training data. The SAS® Cloud Analytics Services may be used as an analytic server with associated cloud services in SAS® Viya®. Some systems may use SAS® In-Memory Statistics for Hadoop® to read big data once and analyze it several times by persisting it in-memory for the entire session. Some systems may be of other types and configurations. The main machine 1405 may coordinate access to the input data 1550 from the location(s) at which the input data is stored.

In some embodiments, the input data 1550 may be received from one or more data sources (e.g., where the data is being measured, observed, collected, stored, etc.). In some embodiments, each of the plurality of worker machines 1410 may receive the input data 1550 from one data source. Thus, each of the plurality of worker machines 1410 may have data that is not present in any of the other worker machines. In some embodiments, if the input data 1550 is from a single data source, non-overlapping portions of the input data may be sent to each of the plurality of worker machines 1410. In some embodiments, in addition to sending the input data 1550 from a particular data source or a portion of the input data to each of the plurality of worker machines 1410, that input data may also be sent to the main machine 1405. Thus, in some embodiments, the main machine 1405 may receive all of the input data 1550.

At operation 1610, responsive to receiving the request at the operation 1605, the first processor deploys the linear mixed model 1555 to solve the optimization problem. In some embodiments, to deploy the linear mixed model 1555, the first processor may construct the objective function (e.g., the likelihood of the observations based on the model), as well as the function of the gradient value and the value of the Hessian matrix. Deploying the linear mixed model 1555 may include making the input data 1550 available, by the first processor, to the linear mixed model. Deploying the linear mixed model 1555 may also include solving the optimization problem, by the first processor and each of the second processors, to produce an optimized solution. In some embodiments, the optimization problem may be solved in a plurality of iterations. In some embodiments, each iteration of the plurality of iterations may be performed sequentially. In other words, results from a previous iteration may be used as a starting point for the next iteration. The process for solving the optimization problem is discussed in more detail in FIG. 17.

At operation 1615, in each iteration, the first processor generates or updates a user interface (e.g., display associated with the output devices 1520) to provide the results from that iteration. For example, in each iteration of the plurality of iterations, the first processor of the main machine 1405 may update the user interface to display data from the current iteration. For example, the data displayed may include an iteration number, value of a decision variable, the gradient value, the value of the Hessian matrix, a difference between the current value of the objective function and a previous value of the objective function from a previous iteration, a difference between the gradient value in the current iteration and the previous iteration, and a difference between the value of the Hessian matrix in the current iteration and the previous iteration. In some embodiments, the first processor may display additional or other information. In some embodiments, the information displayed may be in a tabular form. In some embodiments, the information displayed may be in a list form. In other embodiments, other desired formats, as selected by the user, may be used.

At operation 1620, the first processor outputs the result from the final iteration onto the user interface (e.g., display associated with the output devices 1520). The results may be the optimized result of solving the optimization problem. In some embodiments, the information displayed may be similar to the information displayed at the operation 1615.

Figure 17:
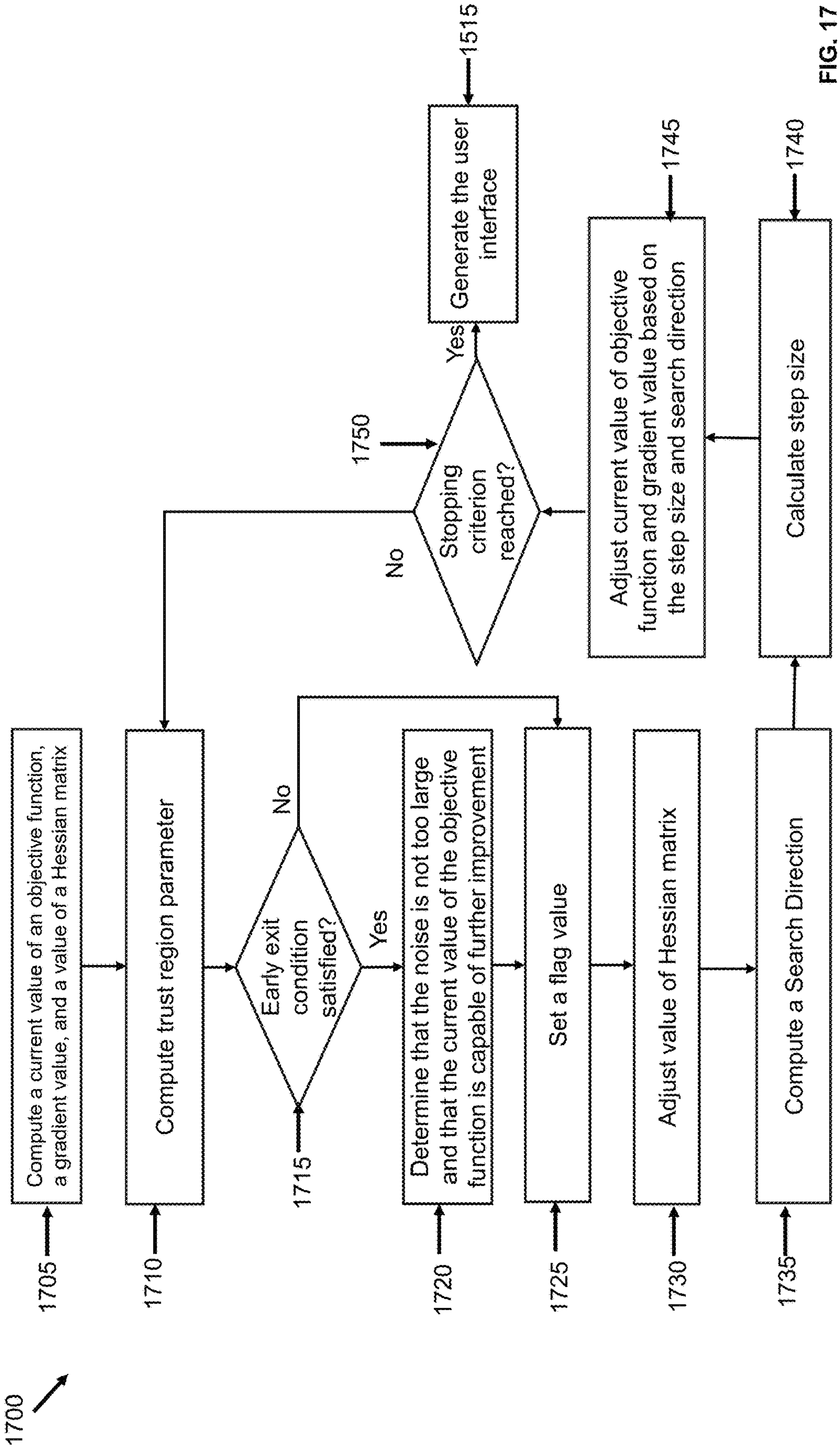
FIG. 17 illustrates a flowchart providing additional details of a certain operation of FIG. 16 in greater detail, according to embodiments of the present technology.

Turning now to FIG. 17, an example flowchart outlining operations of a process 1700 is shown, in accordance with some embodiments of the present disclosure. The process 1700 may be used to solve an optimization problem. The operations of the process 1700 may be performed on the main machine 1405 and/or the plurality of worker machines 1410. The process 1700 may be executed by one or more processors (e.g., the processor 1530) associated with the linear mixed model application 1535 on the main machine 1405 and/or the plurality of worker machines 1410. For example, certain operations of the process 1600 may be performed by a first processor (e.g., the processor 1530) of the main machine 1405 and certain operations of the process 1600 may be performed by a second processor (e.g., the processor 1530) of each of the plurality of worker machines 1410. In particular, one or more processors (e.g., the first processor and/or the second processor) may execute computer-readable instructions (e.g., the linear mixed model computer-readable instructions 1545) to solve the optimization problem. For simplicity, the process 1700 is described as being executed by a processor, which may be the first processor and/or the second processor. The process 1700 may include other or additional operations depending upon the embodiment. The process 1700 describes the operation 1610 in more detail.

At operation 1705, the processor computes a current value of an objective function, a gradient value of the objective function, and a value of a Hessian matrix. In some embodiments, each of the plurality of worker machines 1410 may receive data from a different data source. In some embodiments, in each of the plurality of iterations, the second processor of each of the plurality of worker machines 1410 may compute an intermediate value of the Hessian matrix, an intermediate gradient value, and an intermediate value of the current value of the objective function in parallel based on the respective data at each of the plurality of worker machines. In some embodiments, the second processor of each of the plurality of worker machines 1410 may transmit the intermediate value of the Hessian matrix, the intermediate gradient value, and the intermediate value of the current value of the objective function to the main machine 1405 in each iteration.

In each of the plurality of iterations, the first processor of the main machine 1405 may combine the intermediate value of the Hessian matrix, the intermediate gradient value, and the intermediate value of the current value of the objective function from each of the plurality of worker machines 1410 to obtain the value of the Hessian matrix, the gradient value, and the current value of the objective function, respectively. In some embodiments, in each of the plurality of iterations, the first processor of the main machine 1405 may sum the intermediate value of the Hessian matrix from each of the plurality of worker machines to obtain the value of the Hessian matrix, sum the intermediate gradient value from each of the plurality of worker machines to obtain the gradient value, and sum the intermediate value of the current value of the objective function from each of the plurality of worker machines to obtain the current value of the objective function. In some embodiments, the first processor of the main machine 1405 may use other functions to combine the intermediate value of the Hessian matrix, the intermediate gradient value, and the intermediate value of the current value of the objective function from each of the plurality of worker machines 1410 to obtain the value of the Hessian matrix, the gradient value, and the current value of the objective function, respectively.

Thus, in some embodiments, the first processor and the second processor may use a distributed and multithreaded computing system for computing the value of the Hessian matrix, the gradient value, and the current value of the objective function. In some embodiments, each second processor may compute the intermediate value of the current value of the objective function by solving Equation 1. For example, in some embodiments, each second processor may solve Equation 1 using data from a different data source. In some embodiments, each second processor may compute the intermediate gradient value using Equation 2 on data from a different data source:

$$g = \nabla f(x, y(x)) \qquad \text{Equation 2}$$

In Equation 2, g is the gradient value (e.g., the intermediate gradient value when computed by the second processor and the gradient value when combined by the first processor). The gradient value, g, may be used to compute a projected gradient value, $\hat{g}$, by the first processor. The projected gradient value may help assess how close the current solution is to satisfying the optimality conditions of the objective function being optimized. In some embodiments, the projected gradient value may reflect the direction and magnitude of change needed to improve the objective function, while staying within the set of feasible solutions. In some embodiments, a small projected gradient value may indicate that convergence is close. In some embodiments, the projected gradient value may be represented by Equation 3:

$$\hat{g} = prj(\nabla f(x, y(x))) \quad \text{Equation 3}$$

In particular, the projected gradient value may be computed using Equation 4:

$$\hat{g}^i_k = \begin{cases} g^i_k & l^i < x^i_k < u^i \\ \min(0, g^i_k) & \text{if } x^i_k = l^i \\ \max(0, g^i_k) & \text{if } x^i_k = u^i \end{cases} \quad \text{Equation 4}$$

In Equation 4 above, $g_k$ is the gradient value in a $k^{th}$ iteration, $x_k$ is a decision variable value in the $k^{th}$ iteration, i is the component of vectors, 1, 2, . . . n, l is the lower bound, and u is the upper bound in the optimization problem being solved.

Further, in some embodiments, each second processor may compute an intermediate value of the Hessian matrix, H, using Equation 5 based on data from a different data source:

$$H = \nabla^2 f(x, y(x)) \quad \text{Equation 5}$$

Similar to the gradient value, in some embodiments, the value of the Hessian matrix may be used to assess convergence and standard errors of parameter estimates. In some embodiments, the value of the Hessian matrix may be an approximated value. In some embodiments, the value (e.g., approximated value) of the Hessian matrix may be computed via a Quasi-Newton method (e.g., a Broyden-Fletcher-Goldfarb-Shanno (BFGS) algorithm), which constructs an approximation using gradient information. In some embodiments, computing an exact value of the Hessian matrix may be prohibitively expensive, thereby using an approximated value instead. However, in some embodiments, an exact value of the Hessian matrix may be computed and used.

At operation 1710, the first processor computes a trust region parameter. In some embodiments, a trust region may define a neighborhood around the current values of the parameter estimates where the optimal solution of the objective function lies. In some embodiments, the trust region parameter may define the radius of the trust region. In some embodiments, a quadratic trust region model may be used to iteratively reduce $f(x)$:

$$\underset{s \in \mathbb{R}^n}{\text{minimize}}\ m_k(s) = g_k^T s + \frac{1}{2} s^T H_k\ s, \text{ subject to } \|s\|_2 \le \Delta_k \quad \text{Equation 6}$$

In Equation 6 above, $m_k$, is the trust region model, $g_k$, is the gradient value in the $k^{th}$ iteration, s is a search direction, $H_k$ is the (approximated or exact) value of the Hessian matrix in the $k^{th}$ iteration, and $\Delta_k$ is the trust region parameter. In some embodiments, the processor may compute the trust region parameter by using direct or iterative approaches.

In some embodiments, the trust region parameter may be adaptively increased or decreased based on a ratio of predicted to actual prediction:

$$\eta_k = \frac{f(x_k + s) - f(x_k)}{m_k(s)} \quad \text{Equation 7}$$

In Equation 7, $\eta_k$ is the ratio between the actual reduction in the value of the objective function and the estimated reduction in the value of the objective function. When $\eta_k$ is big (e.g., greater than a predefined threshold), the trust region parameter increases and when $\eta_k$ is small, the trust region parameter decreases.

At operation 1715, the processor determines whether an early exit condition is satisfied. In some embodiments, the first processor of the main machine 1405 may determine whether the early exit condition is satisfied. In some embodiments, satisfaction of the early exit condition may be indicative of noise being potentially present in the objective function. In some embodiments, to determine that the early exit condition is satisfied, the first processor may determine that:

$$\frac{|f(x_k) - f(x_{k-1})|}{\max(|f(x_k)|, FSIZE)} \le r \quad \text{Equation 8}$$

In Equation 8 above, $f(x_k)$ is the current value of the objective function in a $k^{th}$ iteration of the plurality of iterations, $x_k$ is a decision variable value in the $k^{th}$ iteration, $f(x_{k-1})$ is a value of the objective function in the $(k-1)^{th}$ iteration of the plurality of iterations, $x_{k-1}$ is the decision variable value in the $(k-1)^{th}$ iteration, r is a user-defined threshold, FSIZE is a predefined threshold (e.g., 1), k=1, 2, . . . , n, and n is the iteration of the plurality of iterations at which a stopping criterion is reached.

In some embodiments, to determine that the early exit condition is satisfied, the first processor may determine that:

$$\frac{\hat{g}_k^T s_k}{\max(|f(x_k)|, FSIZE)} \le r \quad \text{Equation 9}$$

In Equation 9, $f(x_k)$ is the current value of the objective function in a $k^{th}$ iteration of the plurality of iterations, $x_k$ is decision variable value in the $k^{th}$ iteration, $\hat{g}_k = prj(\nabla f(x_k))$ is a projected gradient value in the $k^{th}$ iteration, r is a user-defined threshold, FSIZE is a predefined threshold (e.g., 1), k=1, 2, . . . , n, and n is the iteration of the plurality of iterations at which the stopping criterion is reached.

In some embodiments, to determine that the early exit condition is satisfied, the first processor may determine that:

$$\frac{\|x_k - x_{k-1}\|}{\max(\|x_k\|, \|x_{k-1}\|, XSIZE)} \le r \quad \text{Equation 10}$$

In Equation 10, $x_k$ is a decision variable value in the $k^{th}$ iteration of the plurality of iterations, $x_{k-1}$ is the decision variable value in the $(k-1)^{th}$ iteration of the plurality of iterations, r is a user-defined threshold, XSIZE is a predefined threshold (e.g., 1), k=1, 2, . . . , n, and n is the iteration of the plurality of iterations at which the stopping criterion is reached.

In some embodiments, the first processor may determine that the early exit condition is satisfied when at least one of the Equations 8, 9, or 10 is satisfied. In some embodiments, the following function may be used to check for satisfaction of the early check condition:

```
Function [nFChgF, nGChgF, nXChgF] =
EarlyExitCheck(k, x_k, x_{k-1}, ĝ_k, s_k, nFChgF, nGChgF, nXChgF)
If k > 0, Then
Calculate:
```

$$fchg = \frac{|f(x_k) - f(x_{k-1})|}{\max(|f(x_k)|, FSIZE)}$$

$$gchg = \frac{\hat{g}_k^T s_k}{\max(|f(x_k)|, FSIZE)}$$

$$xchg = \frac{\|x_k - x_{k-1}\|}{\max(\|x_k\|, \|x_{k-1}\|, XSIZE)}$$

```
  If fchg ≤ r, Then
    nFChgF = nFChgF + 1
  Else
    nFChgF = 0
  EndIf
  If gchg ≤ r, Then
    nGChgF = nGChgF + 1
  Else
    nGChgF = 0
  EndIf
  If xchg ≤ r, Then
    nXChgF = nXChgF + 1
  Else
    nXChgF = 0
  EndIf
  EndIf
End Function
```

If at the operation 1715, the early exit condition is satisfied, the processor may determine that noise is potentially present in the objective function and the process 1700 proceeds to operation 1720. If none of the early exit conditions are satisfied at the operation 1715, the process 1700 determines that the noise is either not present or is very small and the process continues at operation 1725.

At the operation 1720, the processor (e.g., the first processor), responsive to determining that the early exit condition is satisfied, determines that the noise is not larger than a threshold and that the current value of the objective function is capable of further improvement based on one or more of the gradient value, the value of the Hessian matrix, or the current value of the objective function. In some embodiments, to determine that the noise is not larger than the threshold (e.g., the noise is not too large), the first processor may compute:

$$asg = \frac{f(x_k + \delta s) - f(x_k)}{\delta} \quad \text{Equation 11}$$

In Equation 11, δ is a predetermined numerical value, $f(x_k)$ is the current value of the objective function in a $k^{th}$ iteration of the plurality of iterations, $x_k$ is a decision variable value in the $k^{th}$ iteration, s is the search direction, $f(x_k+\delta s)$ is the objective function value at $(x_k+\delta s)$, and asg is a finite difference approximation of a directional derivative along the search direction, s. In some embodiments, the first processor may use the computed asg value to indicate whether the noise is too large or not. The first processor may also use the asg value to set a flag value to mitigate the impact of noise when the noise is large but not larger than the threshold.

Thus, at the operation 1725, the processor sets the flag value responsive to determining that the noise is not larger than the threshold (e.g., the noise is not too large). In some embodiments, the flag value is set to 2 when asg≥0 and the flag value is set to 1 when asg<0 and $|asg-s^T g|>\in$, where g is the gradient in the $k^{th}$ iteration, and ∈ is a predetermined threshold. The operations 1720 and 1725 are explained in greater detail in FIG. 18.

At operation 1730, the processor adjusts the value of the Hessian matrix based on the flag value to reduce the impact of the noise in the current value of the objective function. In particular, the first processor may regularize the value of the Hessian matrix to reduce the impact of the noise. In some embodiments, regularization of the value of the Hessian matrix may improve convergence and stabilize error estimation. In some embodiments, to adjust the value of the Hessian matrix, the first processor may compute:

$$H_k = H_k + \lambda I \quad \text{Equation 12}$$

In Equation 12, $H_k$ is the value of the Hessian matrix computed as $H_k=\nabla^2 f(x_k)$ using Equation 5, $f(x_k)$ is the current value of the objective function in a $k^{th}$ iteration of the plurality of iterations, $x_k$ is a decision variable value in the $k^{th}$ iteration, λ is a regularized number selected based on the flag value, and I is an identity matrix. In some embodiments, the first processor may update the value of the Hessian matrix using a Broyden-Fletcher-Goldfarb-Shanno (BFGS) algorithm. In some embodiments, the BFGS algorithm may be used to iteratively approximate the inverse Hessian matrix to determine the search direction and the step size.

At operation 1735, the processor computes a search direction for the objective function based on the adjusted value of the Hessian matrix determined at the operation 1730, the gradient value computed at the operation 1705, and the trust region parameter determined at the operation 1710. The search direction may be indicative of a direction in which to move the current value of the objective function to improve the current value of the objective function and reduce the impact of the noise. In some embodiments, to compute the search direction, the first processor may use Equation 6.

In some embodiments, the search direction may satisfy an Armijo condition of $$\tilde{g}_k^T s_k \le -\theta \, \|\widehat{g_k}\| \, \|s_k\|, \text{ where } \tilde{g}_k^T$$

is the projected gradient value of $$g_k^T,$$

θ is a predefined constant greater than zero, and $s_k$ is the search direction in the $k^{th}$ iteration.

At operation 1740, the processor calculates a step size for adjusting the current value of the objective function in the search direction based on the flag value. To compute the step size, the processor may compute a maximum allowed step length based on the flag value and compute the step size based on the maximum allowed step length and a predetermined initial step size value. The calculation of the step size is discussed in more detail in FIG. 19.

At operation 1745, the processor adjusts the current value of the objective function and the gradient value based on the step size and the search direction. In some embodiments, to adjust the current value of the objective function, the first processor may compute:

$$x_{k+1} = x_k + \alpha_k s_k \quad \text{Equation 13}$$

In Equation 13, $x_{k+1}$ is a decision variable value in the (k+1) iteration of the plurality of iterations, $x_k$ is the decision variable value in the $k^{th}$ iteration of the plurality of iterations, $\alpha_k$ is the step size in the $k^{th}$ iteration, and $s_k$ is the search direction in the $k^{th}$ iteration. In some embodiments, the processor may update the gradient value based on the adjusted current value of the objective function.

At operation 1750, the processor determines whether a stopping criterion is reached. In some embodiments, the first processor may determine the stopping criterion. The stopping criterion, in some embodiments, may be a defined period of time. When the defined period of time expires, the first processor may determine that the stopping criterion has been reached. In some embodiments, the stooping criterion may be a number of iterations. When the number of iterations is reached, the first processor may determine that the stopping criterion has been reached. In some embodiments, the stopping criterion may be reached when the optimal solution is found. Thus, in some embodiments, the stopping criterion may include one or more of a number of iterations of the plurality of iterations being reached, a predetermined amount of time having passed, or a solution of the optimization problem being found. Other or additional stopping criterion may be used in other embodiments.

If the stopping criterion is reached, the processor generates the user interface at the operation 1515 and outputs an optimized value of the objective function. On the other hand, if the stopping criterion is not reached, the process 1700 loops back to the operation 1710 and repeats the process 1700 using the adjusted current value of the objective function, the adjusted gradient value, and the adjusted value of the Hessian matrix.

Figure 18:
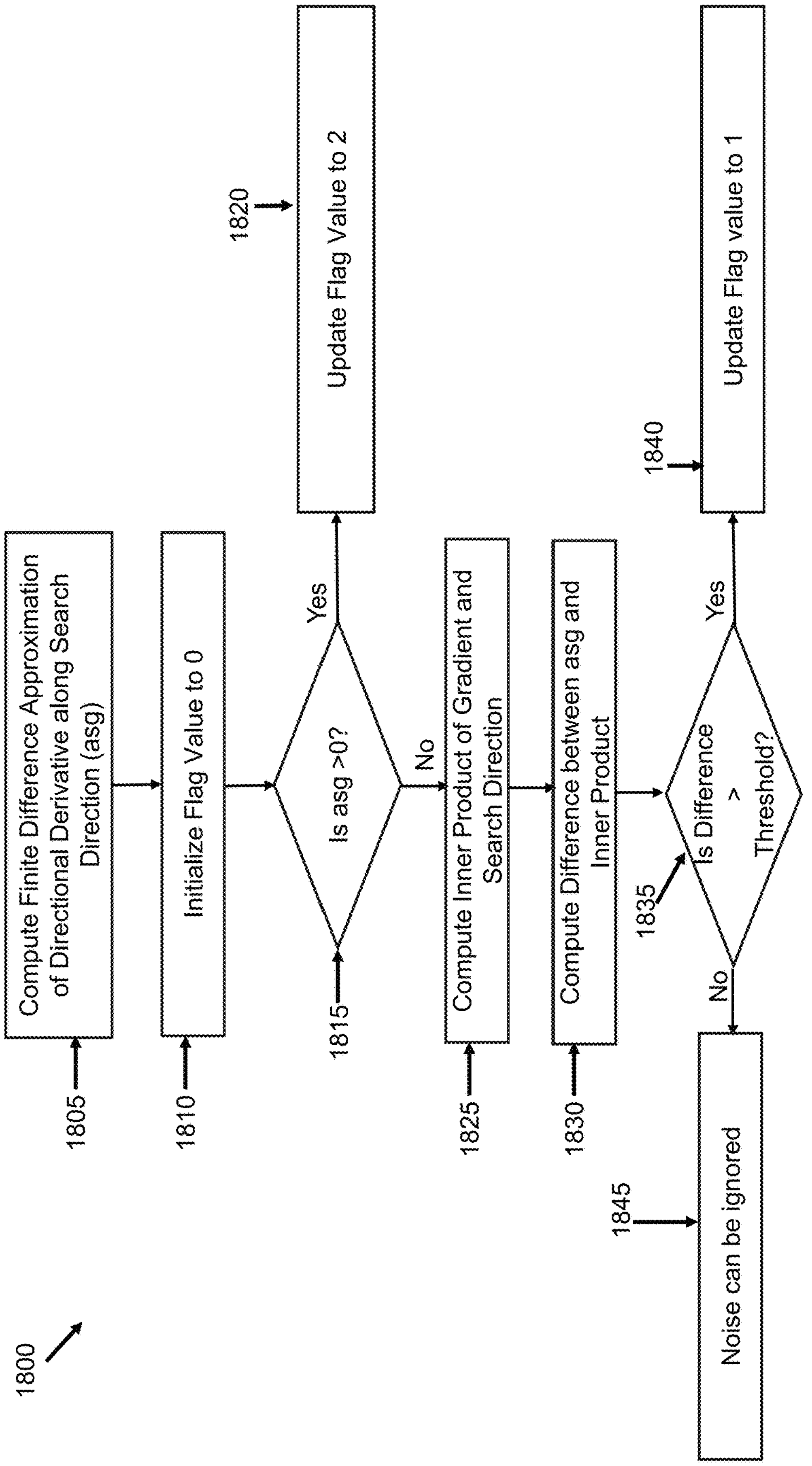
FIG. 18 illustrates a flowchart providing additional details of certain operations of FIG. 17 in greater detail, according to embodiments of the present technology.

Turning now to FIG. 18, an example flowchart outlining operations of a process 1800 is shown, in accordance with some embodiments of the present disclosure. The process 1800 may be used to solve an optimization problem. The operations of the process 1800 may be performed on the main machine 1405. The process 1800 may be executed by one or more processors (e.g., the processor 1530) associated with the linear mixed model application 1535 on the main machine 1405. For example, the operations of the process 1800 may be performed by a first processor (e.g., the processor 1530) of the main machine 1405. In particular, one or more processors (e.g., the first processor) may execute computer-readable instructions (e.g., the linear mixed model computer-readable instructions 1545) to solve the optimization problem. The process 1800 may include other or additional operations depending upon the embodiment. The process 1800 describes the operations 1720 and 1725 in more detail.

At operation 1805, the first processor computes a finite difference approximation of directional derivative, asg, along the search direction. In some embodiments, the first processor may compute the asg value using Equation 11.

At operation 1810, the first processor initializes the flag value to be set at the operation 1725 to 0. At operation 1815, the first processor determines whether the asg value computed at the operation 1805 is greater than 0. If the asg value is greater than 0, then the process 1800 proceeds to operation 1820 where the flag value is updated to 2. The flag value 2 is indicative of the noise being large but not too large. In other words, the objective function is capable of further improvement.

On the other hand, if at the operation 1815, the first processor determines that asg value is not greater than 0, the process 1800 proceeds to operation 1825 where the first processor computes an inner product of gradient and search direction as $s^T g$, where g is the gradient in the $k^{th}$ iteration, s is the search direction, and $s^T$ is the transpose of the search direction. At operation 1830, the first processor computes a difference between the asg value computed at the operation 1805 and the inner product computed at the operation 1825 as $|asg-s^T g|$. At operation 1835, the first processor determines if the difference computed at the operation 1830 is greater than a predetermined threshold, $\epsilon$. Thus, the first processor determines whether:

$$|asg - s^T g| > \epsilon \quad \text{Equation 14}$$

If the difference computed at the operation 1830 is greater than the predetermined threshold, $\epsilon$, then the first processor updates the flag value to 1, indicative of the noise being large but not too large. In other words, the objective function is capable of further improvement. On the other hand, if the difference computed at the operation 1830 is not greater than the predetermined threshold, $\epsilon$, then the first processor determines that the noise is not too large and ignores the noise at operation 1845. An example function that may be used for the process 1800 may be as follows:

Function [IsTrue] = NoiseHandle(f ($x_k$), $x_k$, $\hat{g}_k$, $s_k$, ε)
Initialize: IsTrue = 0, δ > 0
Calculate:

$$asg = \frac{((f(x_k + \delta s_k) - f(x_k)))}{\delta}$$

Figure 19:
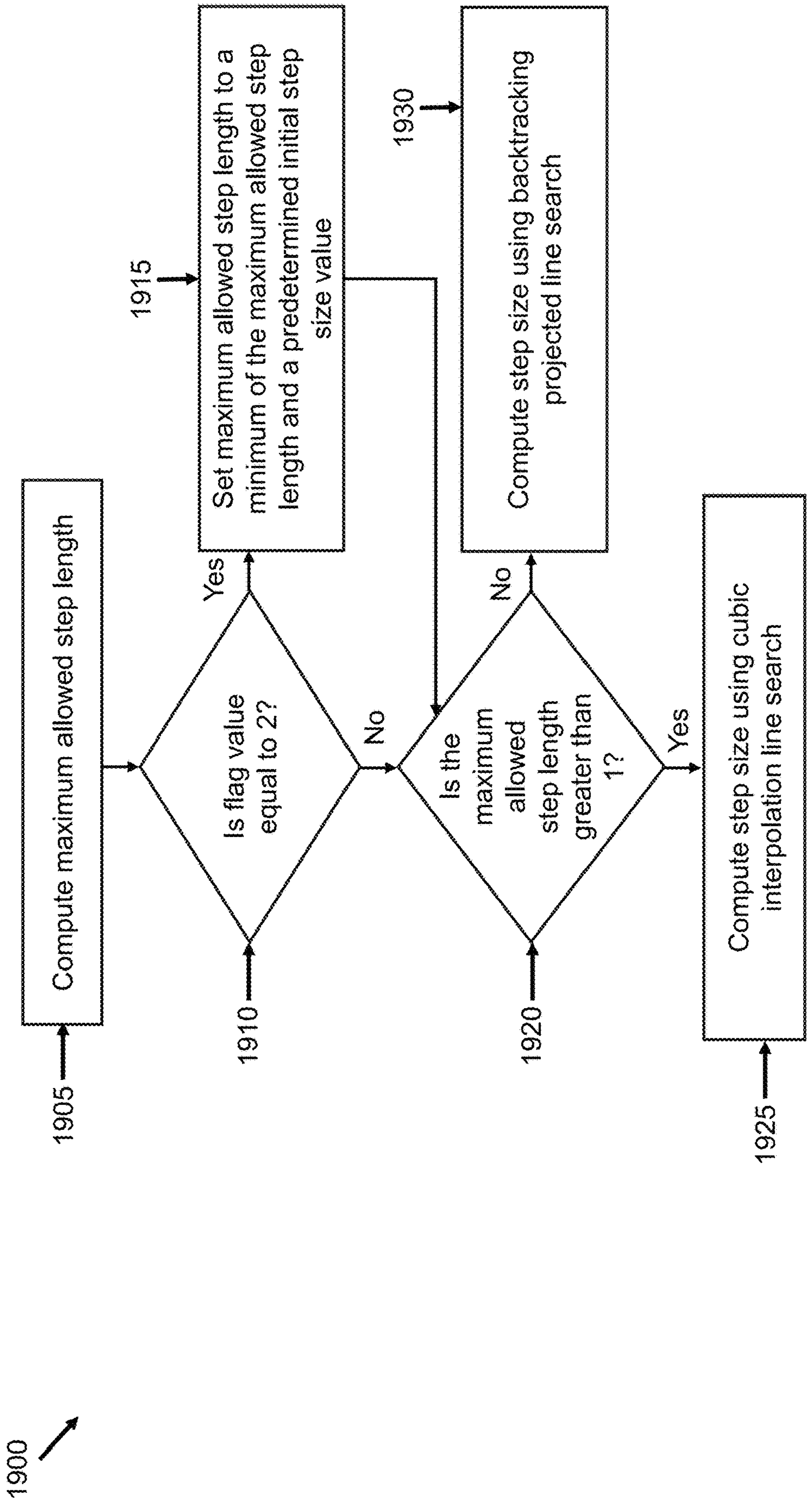
FIG. 19 illustrates a flowchart providing additional details of a certain operation of FIG. 17 in greater detail, according to embodiments of the present technology.

If asg > 0, Then
  IsTrue = 2
Else
  If
    $|asg - \delta\, \hat{g}_k^T s_k| > \varepsilon$
  Then
    IsTrue = 1
EndIf
EndIf
End Function Turning now to FIG. 19, an example flowchart outlining operations of a process 1900 is shown, in accordance with some embodiments of the present disclosure. The process 1900 may be used to solve an optimization problem. The operations of the process 1900 may be performed on the main machine 1405. The process 1900 may be executed by one or more processors (e.g., the processor 1530) associated with the linear mixed model application 1535 on the main machine 1405. For example, the operations of the process 1900 may be performed by a first processor (e.g., the processor 1530) of the main machine 1405. In particular, one or more processors (e.g., the first processor) may execute computer-readable instructions (e.g., the linear mixed model computer-readable instructions 1545) to solve the optimization problem. The process 1900 may include other or additional operations depending upon the embodiment. The process 1900 describes the operation 1740 in more detail.

At operation 1905, the first processor computes the maximum allowed step length. In some embodiments, to compute the maximum allowed step length, the first processor may compute:

$$\alpha_{max} = \max\{\alpha \mid l \le x_k + \alpha s \le u\} \qquad \text{Equation 15}$$

In Equation 15, $\alpha_{max}$ is the maximum allowed step length, $x_k$ is a decision variable value in the $k^{th}$ iteration of the plurality of iterations, l is a lower bound of $x_k$, u is an upper bound of $x_k$, s is the search direction, and α is the step size.

At operation 1910, the first processor determines if the flag value set using the process 1800 is equal to 2. If so, the process 1900 proceeds to operation 1915 where the first processor updates the maximum allowed step length to a minimum of the maximum allowed step length computed at the operation 1905 and a predetermined initial step size value. For example, in some embodiments, the first processor may, responsive to determining that the flag value is equal to 2, assign $\alpha_{max}=\min\{\alpha_{max}, \alpha_{ini}\}$, where $\alpha_{ini}$ is the predetermined initial step size value In some embodiments, the predetermined initial step size may be dependent on the current noise level as well as the noise level from previous iterations. Thus, in some embodiments, the predetermined initial step size may vary in each iteration. In some embodiments, the predetermined initial step size may be 1.0e-2 or 1.0e-6, although other values may be used.

If, at the operation 1910, the first processor determines that the flag value is set to 1 or after the operation 1915, the process 1900 proceeds to operation 1920 where the first processor determines if the maximum allowed step length is greater than 1. If the maximum allowed step length is greater than 1, then at operation 1925, the first processor computes the step size using a cubic interpolation line search. On the other hand, if at the operation 1920, the first processor determines that the maximum allowed step length is not greater than 1, then at operation 1930, the first processor computes the step size using a backtracking projected line search. Thus, to compute the step size, the first processor, responsive to determining that $\alpha_{max} \ge 1$, computes the step size using a cubic interpolation line search based on the predetermined initial step size value of $\alpha_{ini}=1$ or responsive to determining that $\alpha_{max}<1$, computes the step size using a backtracking projected line search based on the predetermined initial step size value of $\alpha_{ini}=1$.

In some embodiments, the cubic interpolation line search to compute the step size satisfies a Wolfe's condition of:

$$f(x+\alpha s_k) \le f(x) + c_1 \alpha_k \nabla f(x)^T s_k \qquad \text{Equation 16}$$

$$\nabla f(x+\alpha s_k)^T s_k \ge c_2 \nabla f(x)^T s_k \qquad \text{Equation 17}$$

In Equations 16 and 17, $s_k$ is the search direction in a $k^{th}$ iteration of the plurality of iterations, $f(x)$ is the current value of the objective function, c1 and c2 are constant values, T indicates a transpose operation, $\alpha_k$ is the step size in the $k^{th}$ iteration.

In some embodiments, using the backtracking projected line search to compute the step size satisfies an Armijo's condition of:

$$f(x+\alpha \hat{s}_k) \le f(x) + c_1 \alpha_k \nabla f(x)^T \hat{s}_k \qquad \text{Equation 18}$$

In Equation 18, $\hat{s}_k$ is the projected search direction in a $k^{th}$ iteration of the plurality of iterations, $f(x)$ is the current value of the objective function, c1 is a constant value, T indicates a transpose operation, $\alpha_k$ is the step size in the $k^{th}$ iteration.

The processes 1700-1900 may be summarized by the following function:

```
Require: Set σ > 0, k=0, nFChgF = 0, nGChgF = 0, nXChgF = 0, Δ_0 > 0,
ε > 0 and α_min > 0.
Require: Choose x_0, H_0, λ_2 > λ_1 > 0, α_ini < 1, N, θ.
While ||ĝ_k|| > σ:
  [nFChgF, nGChgF, nXChgF] = EarlyExitCheck(k, x_k, x_{k−1}, ĝ_k, s_k,
nFChgF, nGChgF, nXChgF)
  nChgF = max(nFChgF, nGChgF, nXChgF)
  If nChgF ≥ N, Then
    break                          –> No further improvement likely
  Else
    if nChgF ≥ 1, Then
      IsTrue = NoiseHandle(f(x_k), x_k, ĝ_k, s_k, ε)
    EndIf
  EndIf
  If IsTrue ≥ 2, Then
     H_k = H_k + λ_2 I
  Else
    If IsTrue ≥ 1, Then
      H_k = H_k + λ_1 I
    EndIf
  EndIf
  Obtain search direction s by solving Equation 6 that satisfies:
            ĝ_k^T s_k ≤ −θ ||ĝ_k|| ||s_k||
Calculate maximum allowed step length α_max for line search,
        α_max = max{α | l ≤ x_k + α s_k ≤ u}
If IsTrue ≥ 1, Then
            α_max = min(α_max, α_min)
EndIf
If α_max ≥ 1:
    Use cubic interpolation line search with α=1 satisfying Wolfe's
    conditions;
        f(x + α s_k) ≤ f(x) + c_1 α_k ∇f(x)^T s_k
          ∇f(x + α s_k)^T p ≥ c_2 ∇f(x)^T s_k
    Set d_k = s_k.
Else:
    Use backtracking projected line search with initial α_max satisfying
    Armijo condition; d_k is projected s_k.
        f(x + α s_k) ≤ f(x) + c_1 α_k ∇f(x)^T d_k
EndIf
Update x_{k+1} = x_k + α_k d_k
Update H_{k+1} using BFGS update formula, update trust region radius Δ_k
k = k + 1
End While
```

Inventors conducted experiments to compare the proposed approach with noise handling with an approach without noise handling. Table 1 summarizes the test results:

TABLE 1

| Test # | Size of problem (e.g., number of optimization problems, n) | CPU time – conventional approach | CPU time – proposed approach | Improvement (Without noise handling/With noise handling) |
|---|---|---|---|---|
| Problem #1 | 10 | 226.68 | 94.65 | 2.39 |
| Problem #2 | 3 | 1.89 | 1.83 | 1.03 |
| Problem #3 | 3 | 219.61 | 36.15 | 6.07 |
| Problem #4 | 7 | 97.69 | 93.04 | 1.05 |
| Problem #5 | 4 | 472.55 | 82.26 | 5.74 |
| Problem #6 | 105 | 838.77 | 515.65 | 1.63 |

The CPU time in Table 1 above is the average time from ten computing devices. The approach without noise handling and the proposed approach with noise handling both find the same least function value for all the problems except for problem #1. With the problem #1, the proposed approach with noise handling finds 553611.10398 values while the approach without noise handling finds 542525.30355 values. Further, from Table 1, it may be seen that the proposed approach takes less CPU time to find the optimal solution relative to the conventional approach in each of the 6 problems.

The herein described subject matter illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents. The word "illustrative" is used herein to mean serving as an example, instance, or illustration. Any aspect or design described herein as "illustrative" is not necessarily to be construed as preferred or advantageous over other aspects or designs.

What is claimed is:

1. A system to detect and handle noise, the system comprising:

a memory having computer-readable instructions stored thereon; and a distributed computing system comprising:

a main machine associated with a first processor;

a plurality of worker machines, each associated with a second processor and configured to execute distributed portions of a linear mixed model in parallel, wherein each of the plurality of worker machines is configured to perform one or more same operations under control of the main machine, and wherein the first processor and the second processor execute the computer-readable instructions to:

receive, via a user interface of the main machine, a request to execute the linear mixed model on a dataset distributed across the plurality of worker machines; and responsive to receiving the request, iteratively deploy the linear mixed model across the plurality of worker machines to:

(A) compute, by the plurality of worker machines in parallel, a plurality of intermediate model performance values associated with distributed execution states of the linear mixed model and detect, based on one or more inconsistencies among the plurality of intermediate model performance values computed by different worker machines, numerical noise associated with distributed execution of the linear mixed model;

(B) responsive to determining that the numerical noise, determine, by the main machine, whether the numerical noise satisfies a convergence instability condition indicating that additional distributed iterations of the linear mixed model are capable of improving convergence of the linear mixed model;

(C) responsive to determining that the convergence instability condition is satisfied, adjust at least some of the one or more parameters associated with distributed execution of the linear mixed model to obtain one or more adjusted parameters that reduce the one or more inconsistencies among the plurality of intermediate performance values;

(D) redistribute, by the main machine, the one or more adjusted parameters to the plurality of worker machines and execute an additional distributed iteration of the linear mixed model using the one or more adjusted parameters to reduce the numerical noise causing distributed computational instability associated with numerical noise;

(E) determine whether a stopping criterion associated with convergence of the distributed execution of the linear mixed model is satisfied; and (F) responsive to determining that the stopping criterion is not satisfied, repeat (A)-(E) with the adjusted output, wherein the adjusting of the one or more parameters of the linear mixed model causes the stopping criterion to be satisfied based on the adjustment parameters, or responsive to determining that the stopping criterion has reached, transmit the output via the user interface of the main machine.

2. A non-transitory computer-readable medium comprising computer-readable instructions stored thereon that when executed by a first processor associated with a main machine and a second processor associated with each of a plurality of worker machines that are configured to execute one or more same operations including executing distributed portions of a linear mixed model in parallel within a distributed computing system, cause the first processor and the second processor to:

receive, via a user interface of the computing system implementing a linear mixed model, a request to execute the linear mixed model on a dataset distributed across the plurality of worker machines; and responsive to receiving the request, iteratively deploy the linear mixed model across the plurality of worker machines to:

(A) computing, by the plurality of worker machines in parallel, a plurality of intermediate model performance values associated with distributed execution states of the linear mixed model and detect, based on one or more inconsistencies among the plurality of intermediate model performance values computed by different worker machines, numerical noise associated with distributed execution of the linear mixed model, the intermediate performance values including a current value of an objective function, a gradient value of the objective function, and a value of a Hessian matrix;

(B) responsive to detecting the numerical noise, determining, by the main machine, whether the numerical noise satisfies a convergence instability condition including determining that an early exit condition is satisfied, wherein the convergence instability condition indicates that additional distributed iterations of the linear mixed model are capable of improving convergence of the linear mixed model;

(C) responsive to determining that the early exit condition is satisfied, determining that the noise is not larger than a threshold and that the current value of the objective function is capable of further improvement based on one or more of the gradient value, the value of the Hessian matrix, or the current value of the objective function;

(D) setting a flag value responsive to determining that the noise is not larger than the threshold;

(E) adjusting the value of the Hessian matrix;

(F) computing a search direction for the objective function based on the adjusted value of the Hessian matrix, the gradient value, and a trust region parameter, wherein the search direction is indicative of a direction in which to move the current value of the objective function to improve the current value of the objective function and reduce the impact of the noise;

(G) calculating a step size for adjusting the current value of the objective function in the search direction based on the flag value;

(H) adjusting at least some of the one or more parameters associated with distributed execution of the linear mixed model to obtain one or more adjusted parameters that reduce the one or more inconsistencies among the plurality of intermediate performance values including adjusting the current value of the objective function and the gradient value based on the step size and the search direction;

(I) determining whether a stopping criterion associated with convergence of the distributed execution of the linear mixed model is satisfied; and (J) responsive to determining that the stopping criterion is not satisfied, repeating (B)-(I) with the adjusted current value of the objective function and the gradient value, wherein the adjusting of the value of the Hessian matrix associated with the linear mixed model causes the stopping criterion to be satisfied based on the adjusted value of the Hessian matrix, or responsive to determining that the stopping criterion has reached, outputting an optimized value of the objective function.

3. The non-transitory computer-readable medium of claim 2, wherein each of the plurality of worker machines receives data from a different data source, and wherein, in each of the plurality of iterations, the computer-readable instructions further cause the second processor of each of the plurality of worker machines to:

compute an intermediate value of the Hessian matrix, an intermediate gradient value, and an intermediate value of the current value of the objective function in parallel based on the respective data at each of the plurality of worker machines; and transmit the intermediate value of the Hessian matrix, the intermediate gradient value, and the intermediate value of the current value of the objective function to the main machine.

4. The non-transitory computer-readable medium of claim 3, wherein, in each of the plurality of iterations, the computer-readable instructions further cause the first processor of the main machine to:

combine the intermediate value of the Hessian matrix, the intermediate gradient value, and the intermediate value of the current value of the objective function from each of the plurality of worker machines to obtain the value of the Hessian matrix, the gradient value, and the current value of the objective function, respectively; and compute the search direction, the trust region parameter, and the step size based on one or more of the value of the Hessian matrix, the gradient value, and the current value of the objective function.

5. The non-transitory computer-readable medium of claim 4, wherein, in each of the plurality of iterations, the computer-readable instructions further cause the first processor of the main machine to sum the intermediate value of the Hessian matrix from each of the plurality of worker machines to obtain the value of the Hessian matrix, sum the intermediate gradient value from each of the plurality of worker machines to obtain the gradient value, and sum the intermediate value of the current value of the objective function from each of the plurality of worker machines to obtain the current value of the objective function.

6. The non-transitory computer-readable medium of claim 2, wherein, in each iteration of the plurality of iterations, the computer-readable instructions further cause the first processor of the main machine to update the user interface to display data from the respective iteration, wherein the data displayed comprises an iteration number, value of a decision variable, the gradient value, the value of the Hessian matrix, a difference between the current value of the objective function and a previous value of the objective function from a previous iteration, a difference between the gradient value in the current iteration and the previous iteration, and a difference between the value of the Hessian matrix in the current iteration and the previous iteration.

7. The non-transitory computer-readable medium of claim 2, wherein to deploy the linear mixed model, the computer-readable instructions implement an LMIXED procedure to fit the linear mixed model, and wherein the LMIXED procedure executes the operations (A)-(J).

8. The non-transitory computer-readable medium of claim 2, wherein to determine that the early exit condition is satisfied, the computer-readable instructions further cause the first processor to determine that:

$$\frac{|f(x_k)-f(x_{k-1})|}{\max(|f(x_k)|, FSIZE)} \leq r$$

where $f(x_k)$ is the current value of the objective function in a $k^{th}$ iteration of the plurality of iterations, $x_k$ is a decision variable value in the $k^{th}$ iteration, $f(x_{k-1})$ is a value of the objective function in the $(k-1)^{th}$ iteration of the plurality of iterations, $x_{k-1}$ is the decision variable value in the $(k-1)^{th}$ iteration, r is a user-defined threshold, FSIZE is a predefined threshold, k=1, 2, . . . , n, and n is the iteration of the plurality of iterations at which the stopping criterion is reached.

9. The non-transitory computer-readable medium of claim 2, wherein to determine that the early exit condition is satisfied, the computer-readable instructions further cause the first processor to determine that:

$$\frac{\widehat{g_k}^T s_k}{\max(|f(x_k)|, FSIZE)} \leq r$$

where $f(x_k)$ is the current value of the objective function in a $k^{th}$ iteration of the plurality of iterations, $x_k$ is decision variable value in the $k^{th}$ iteration, $\widehat{g_k}=\text{prj}(\nabla f(x_k))$ is a projected gradient value in the $k^{th}$ iteration, $\widehat{g_k}^T$ is a transpose value of $\widehat{g_k}$, r is a user-defined threshold, FSIZE is a predefined threshold, k=1, 2, . . . , n, and n is the iteration of the plurality of iterations at which the stopping criterion is reached.

10. The non-transitory computer-readable medium of claim 2, wherein to determine that the early exit condition is satisfied, the computer-readable instructions further cause the first processor to determine that:

$$\frac{\|x_k - x_{k-1}\|}{\max(\|x_k\|, \|x_{k-1}\|, XSIZE)} \leq r$$

where $x_k$ is a decision variable value in the $k^{th}$ iteration of the plurality of iterations, $x_{k-1}$ is the decision variable value in the $(k-1)^{th}$ iteration of the plurality of iterations, r is a user-defined threshold, XSIZE is a predefined threshold, k=1, 2, . . . , n, and n is the iteration of the plurality of iterations at which the stopping criterion is reached.

11. The non-transitory computer-readable medium of claim 2, wherein to determine that the early exit condition is satisfied, the computer-readable instructions further cause the first processor to determine that:

$$\frac{|f(x_k)-f(x_{k-1})|}{\max(|f(x_k)|, FSIZE)} \leq r$$

-continued or $$\frac{\widehat{g_k}^T S_k}{\max(|f(x_k)|, FSIZE)} \leq r$$

or $$\frac{\|x_k - x_{k-1}\|}{\max(\|x_k\|, \|x_{k-1}\|, XSIZE)} \leq r$$

where $f(x_k)$ is the current value of the objective function in a $k^{th}$ iteration of the plurality of iterations, $x_k$ is a decision variable value in the $k^{th}$ iteration, $f(x_{k-1})$ is a value of the objective function in the $(k-1)^{th}$ iteration of the plurality of iterations, $x_{k-1}$ is the decision variable value in the $(k-1)^{th}$ iteration, $\widehat{g_k}=\text{prj}(\nabla f(x_k))$ is a projected gradient value in the $k^{th}$ iteration, $\widehat{g_k}^T$ is a transpose value of $\widehat{g_k}$, r is a user-defined threshold, FSIZE and XSIZE are predefined thresholds, k=1, 2, . . . , n, and n is the iteration of the plurality of iterations at which the stopping criterion is reached.

12. The non-transitory computer-readable medium of claim 2, wherein to determine that the noise is not larger than the threshold, the computer-readable instructions further cause the first processor to compute:

$$asg = \frac{f(x_k + \delta s) - f(x_k)}{\delta}$$

where δ is a predetermined numerical value, $f(x_k)$ is the current value of the objective function in a $k^{th}$ iteration of the plurality of iterations, $x_k$ is a decision variable value in the $k^{th}$ iteration, s is the search direction, $f(x+\delta s)$ is objective function value at $(x_k+\delta s)$, and asg is a finite difference approximation of a directional derivative along the search direction, s; and wherein the flag value is set to 2 when asg≥0 and the flag value is set to 1 when asg<0 and $|asg-s^T g|>\epsilon$, where g is the gradient in the $k^{th}$ iteration, and $\epsilon$ is a predetermined threshold.

13. The non-transitory computer-readable medium of claim 2, wherein to adjust the value of the Hessian matrix, the computer-readable instructions further cause the first processor to compute:

$$H_k = H_k + \lambda I$$

where $H_k$ is the value of the Hessian matrix computed as $H_k=\nabla^2 f(x_k)$, $f(x_k)$ is the current value of the objective function in a $k^{th}$ iteration of the plurality of iterations, $x_k$ is a decision variable value in the $k^{th}$ iteration, λ is a regularized number selected based on the flag value, and I is an identity matrix.

14. The non-transitory computer-readable medium of claim 2, wherein to compute the search direction, the computer-readable instructions further cause the first processor to compute:

$$\text{minimize } m_k(s) = g_k^T s + \frac{1}{2} s^T H_k s,$$

-continued $$\text{subject to } \|s\|_2 \leq \Delta_k, \text{ and } s^i = 0 \text{ for all } i \in \mathbb{I}_k$$

where $m_k(s)$ is the optimization problem, $g_k=\nabla f(x_k)$ is the gradient value at a $k^{th}$ iteration of the plurality of iterations, $$g_k^T$$

is a transpose of $g_k$, $s\in\mathbb{R}^n$ is the search direction, $s^T$ is the transpose of s, $H_k$ is a Hessian approximation of the Hessian matrix in the $k^{th}$ iteration, $\Delta_k$ is the trust region parameter in the $k^{th}$ iteration, $\mathbb{I}_k$ is an index of variables that remain fixed and defined as $$\{i \mid x_k^i = l^i \text{ and } \nabla_i f(x_k) \geq 0, \text{ or } x_k^i = u^i \text{ and } \nabla_i f(x_k) \leq 0\}, x_k^i$$

is the $i^{th}$ component of a decision variable $x_k$ in the $k^{th}$ iteration, $l^i$ is a lower bound for the $i^{th}$ component of the decision variable $x_k$ in the $k^{th}$ iteration, and $u^i$ is an upper bound for the $i^{th}$ component of the decision variable $x_k$ in the $k^{th}$ iteration.

15. The non-transitory computer-readable medium of claim 14, wherein the search direction satisfies an Armijo condition of $$\widehat{g_k}^T s_k \leq -\theta \|\widehat{g_k}\| \|s_k\|, \text{ where } \widehat{g_k}^T$$

is a projected gradient value of $$g_k^T,$$

θ is a predefined constant greater than zero, and $s_k$ is the search direction in the $k^{th}$ iteration.

16. The non-transitory computer-readable medium of claim 2, wherein to compute the step size, the computer-readable instructions further cause the first processor to:

compute a maximum allowed step length based on the flag value; and compute the step size based on the maximum allowed step length and a predetermined initial step size value.

17. The non-transitory computer-readable medium of claim 16, wherein to compute the maximum allowed step length, the computer-readable instructions further cause the first processor to compute:

$$\alpha_{max} = \max\{\alpha | l \leq x_k + \alpha s \leq u\}$$

where $\alpha_{max}$ is the maximum allowed step length, $x_k$ is a decision variable value in the $k^{th}$ iteration of the plurality of iterations, l is a lower bound of $x_k$, u is an upper bound of $x_k$, s is the search direction, and α is the step size.

18. The non-transitory computer-readable medium of claim 17, wherein the computer-readable instructions further cause the first processor to:

determine that the flag value is equal to 2; and responsive to determining that the flag value is equal to 2, assign $\alpha_{max}$=min{$\alpha_{max}$, $\alpha_{ini}$}, where $\alpha_{ini}$ is the predetermined initial step size value.

19. The non-transitory computer-readable medium of claim 18, wherein to compute the step size, the computer-readable instructions further cause the first processor to:

responsive to determining that $\alpha_{max}\geq 1$, compute the step size using a cubic interpolation line search based on the predetermined initial step size value of $\alpha_{ini}$=1; or responsive to determining that $\alpha_{max}<1$, compute the step size using a backtracking projected line search based on the predetermined initial step size value of $\alpha_{ini}$=1.

20. The non-transitory computer-readable medium of claim 19, wherein using the cubic interpolation line search to compute the step size satisfies a Wolfe's condition of $$f(x+\alpha s_k)\leq f(x)+c_1\alpha_k\nabla f(x)^T s_k,\text{ and}$$

$$\nabla f(x+\alpha s_k)^T s_k \geq c_2\nabla f(x)^T s_k,$$

where $s_k$ is the search direction in a $k^{th}$ iteration of the plurality of iterations, $f(x)$ is the current value of the objective function, c1 and c2 are constant values, T indicates a transpose operation, $\alpha_k$ is the step size in the $k^{th}$ iteration.

21. The non-transitory computer-readable medium of claim 19, wherein using the backtracking projected line search to compute the step size satisfies a Armijo's condition of $$f(x+\alpha\hat{s}_k)\leq f(x)+c_1\alpha_k\nabla f(x)^T\hat{s}_k,$$

where $\hat{s}_k$ is the projected search direction in a $k^{th}$ iteration of the plurality of iterations, $f(x)$ is the current value of the objective function, c1 is a constant value, T indicates a transpose operation, $\alpha_k$ is the step size in the $k^{th}$ iteration.

22. The non-transitory computer-readable medium of claim 2, wherein to adjust the current value of the objective function, the computer-readable instructions further cause the first processor to compute:

$$x_{k+1}=x_k+\alpha_k s_k$$

where $x_k$+1 is a decision variable value in the $(k+1)^{th}$ iteration of the plurality of iterations, $x_k$ is the decision variable value in the $k^{th}$ iteration of the plurality of iterations, $\alpha_k$ is the step size in the $k^{th}$ iteration, and $s_k$ is the search direction in the $k^{th}$ iteration.

23. The non-transitory computer-readable medium of claim 2, wherein the computer-readable instructions further cause the first processor to adjust the trust region parameter by:

computing:

$$\eta_k=\frac{f(x_k+s)-f(x_k)}{m(s)}$$

where

-continued $$m(s)=g_k^T s+\frac{1}{2}s^T H_k s$$

and g is the gradient in the $k^{th}$ iteration, $g^T$ is a transpose value of g, s is the search direction, $\Delta_k$ is a trust region radius in the $k^{th}$ iteration, $H_k$ is the approximated $\nabla^2 f(x_k)$, and $x_k$ is a decision variable value in the $k^{th}$ iteration; and increasing a value of the trust region radius responsive to determining that $\eta_k$ is greater than a first threshold or decrease the value of the trust region radius determining that $\eta_k$ is less than the first threshold.

24. The non-transitory computer-readable medium of claim 2, wherein the stopping criterion comprises one or more of a number of iterations of the plurality of iterations being reached, a predetermined amount of time having passed, or a solution of the optimization problem being found.

25. A system comprising:

a memory having computer-readable instructions stored thereon; and a first processor associated with a main machine and a second processor associated with each of a plurality of worker machines that are configured to execute one or more same operations including executing distributed portions of a linear mixed model in parallel within a distributed computing system that execute the computer-readable instructions to:

receive, via a user interface of the computing system implementing a linear mixed model, a request to execute the linear mixed model on a dataset distributed across the plurality of worker machines; and responsive to receiving the request, iteratively deploy the linear mixed model across the plurality of worker machines including:

(A) computing, by the plurality of worker machines of the distributed computing system operating in parallel, a plurality of intermediate model performance values associated with distributed execution states of the linear mixed model and detect, based on one or more inconsistencies among the plurality of intermediate model performance values computed by different worker machines, numerical noise associated with distributed execution of the linear mixed model, the plurality of intermediate model performance values including a current value of an objective function, a gradient value of the objective function, and a value of a Hessian matrix;

(B) responsive to detecting the numerical noise, determining, by the main machine, whether the numerical noise satisfies a convergence instability condition including determining that an early exit condition is satisfied, wherein the convergence instability condition indicates that additional distributed iterations of the linear mixed model are capable of improving convergence of the linear mixed model;

(C) responsive to determining that the early exit condition is satisfied, determining that the noise is not larger than a threshold and that the current value of the objective function is capable of further improvement based on one or more of the gradient value, the value of the Hessian matrix, or the current value of the objective function;

(D) setting a flag value responsive to determining that the noise is not larger than the threshold;

(E) adjusting the value of the Hessian matrix;

(F) computing a search direction for the objective function based on the adjusted value of the Hessian matrix, the gradient value, and a trust region parameter, wherein the search direction is indicative of a direction in which to move the current value of the objective function to improve the current value of the objective function and reduce the impact of the noise;

(G) calculating a step size for adjusting the current value of the objective function in the search direction based on the flag value;

(H) adjusting at least some of the one or more parameters associated with distributed execution of the linear mixed model to obtain one or more adjusted parameters that reduce the one or more inconsistencies among the plurality of intermediate performance values including adjusting the current value of the objective function and the gradient value based on the step size and the search direction;

(I) determining whether a stopping criterion associated with convergence of the distributed execution of the linear mixed model is satisfied; and (J) responsive to determining that the stopping criterion is not satisfied, repeating (B)-(I) with the adjusted current value of the objective function and the gradient value, wherein the adjusting of the value of the Hessian matrix associated with the linear mixed model causes the stopping criterion to be satisfied based on the adjusted value of the Hessian matrix, or responsive to determining that the stopping criterion has reached, outputting an optimized value of the objective function.

26. The system of claim 25, wherein to determine that the early exit condition is satisfied, the computer-readable instructions further cause the first processor to determine that:

$$\frac{|f(x_k) - f(x_{k-1})|}{\max(|f(x_k)|, FSIZE)} \le r$$

or $$\frac{\widehat{g_k}^T S_k}{\max(|f(x_k)|, FSIZE)} \le r$$

or $$\frac{\|x_k - x_{k-1}\|}{\max(\|x_k\|, \|x_{k-1}\|, XSIZE)} \le r$$

where $f(x_k)$ is the current value of the objective function in a $k^{th}$ iteration of the plurality of iterations, $x_k$ is a decision variable value in the $k^{th}$ iteration, $f(x_{k-1})$ is a value of the objective function in the $(k-1)^{th}$ iteration of the plurality of iterations, $x_{k-1}$ is the decision variable value in the $(k-1)^{th}$ iteration, $\widehat{g_k}=\text{prj}(\nabla f(x_k))$ is a projected gradient value in the $k^{th}$ iteration, $\widehat{g_k}^T$ is a transpose value of $\widehat{g_k}$, r is a user-defined threshold, FSIZE and XSIZE are predefined thresholds, k=1, 2, . . . , n, and n is the iteration of the plurality of iterations at which the stopping criterion is reached.

27. The system of claim 25, wherein to determine that the noise is not larger than the threshold, the computer-readable instructions further cause the first processor to compute:

$$asg = \frac{f(x_k + \delta s) - f(x_k)}{\delta}$$

where $\delta$ is a predetermined numerical value, $f(x_k)$ is the current value of the objective function in a $k^{th}$ iteration of the plurality of iterations, $x_k$ is a decision variable value in the $k^{th}$ iteration, s is the search direction, $f(x_k+\delta s)$ is objective function value at $(x_k+\delta s)$, and asg is a finite difference approximation of a directional derivative along the search direction, s; and wherein the flag value is set to 2 when $asg \ge 0$ and the flag value is set to 1 when $asg<0$ and $|asg-s^T g|>\epsilon$, where g is the gradient in the $k^{th}$ iteration, and $\epsilon$ is a predetermined threshold.

28. The system of claim 25, wherein to compute the search direction, the computer-readable instructions further cause the first processor to compute:

$$\text{minimize } m_k(s) = g_k^T s + \frac{1}{2} s^T H_k s,$$

$$\text{subject to } \|s\|_2 \le \Delta_k, \text{ and } s^i = 0 \text{ for all } i \in \rrbracket_k$$

where $m_k(s)$ is the optimization problem, $g_k=\nabla f(x_k)$ is the gradient value at a $k^{th}$ iteration of the plurality of iterations, $$g_k^T$$

is a transpose of $g_k$, $s \in \mathbb{R}^n$ is the search direction, $s^T$ is the transpose of s, $H_k$ is a Hessian approximation of the Hessian matrix in the $k^{th}$ iteration, $\Delta_k$ is the trust region parameter in the $k^{th}$ iteration, $\|_k$ is an index of variables that remain fixed and defined as $$\{i \mid x_k^i = l^i \text{ and } \nabla_i f(x_k) \ge 0, \text{ or } x_k^i = u^i \text{ and } \nabla_i f(x_k) \le 0\}, x_k^i$$

is the $i^{th}$ component of a decision variable $x_k$ in the $k^{th}$ iteration, $l^i$ is a lower bound for the $i^{th}$ component of the decision variable $x_k$ in the $k^{th}$ iteration, and $u^i$ is an upper bound for the $i^{th}$ component of the decision variable $x_k$ in the $k^{th}$ iteration, wherein the search direction satisfies an Armijo condition of $$\widehat{g_k}^T s_k \le -\theta \, \|\widehat{g_k}\| \, \|s_k\|,$$

where $\widehat{g_k^T}$ is the projected gradient value of $$g_k^T,$$

$\theta$ is a predefined constant greater than zero, and $s_k$ is the search direction in the $k^{th}$ iteration.

29. The system of claim 25, wherein to compute the step size, the computer-readable instructions further cause the first processor to compute:

compute a maximum allowed step length based on the flag value, wherein to compute the maximum allowed step length, the computer-readable instructions further cause the first processor to compute:

$$\alpha_{max} = \max\{\alpha | l \le x_k + \alpha s \le u\}$$

where $\alpha_{max}$ is the maximum allowed step length, $x_k$ is a decision variable value in the $k^{th}$ iteration of the plurality of iterations, l is a lower bound of $x_k$, u is an upper bound of $x_k$, s is the search direction, and $\alpha$ is the step size, wherein the computer-readable instructions further cause the first processor to determine that the flag value is equal to 2 and responsive to determining that the flag value is equal to 2, assign $\alpha_{max}$=min $\{\alpha_{max}, \alpha_{ini}\}$, where $\alpha_{ini}$ is the predetermined initial step size value; and compute the step size based on the maximum allowed step length and a predetermined initial step size value, wherein to compute the step size, the computer-readable instructions further cause the first processor to:

responsive to determining that $\alpha_{max} \ge 1$, compute the step size using a cubic interpolation line search based on the predetermined initial step size value of $\alpha$=1; or responsive to determining that $\alpha_{max} < 1$, compute the step size using a backtracking projected line search based on the predetermined initial step size value of $\alpha$=1, wherein using the cubic interpolation line search to compute the step size satisfies a Wolfe's condition of $$f(x + \alpha s_k) \le f(x) + c_1 \alpha_k \nabla f(x)^T s_k, \text{ and}$$

$$\nabla f(x + \alpha s_k)^T s_k \ge c_2 \nabla f(x)^T s_k,$$

where $s_k$ is the search direction in a $k^{th}$ iteration of the plurality of iterations, $f(x)$ is the current value of the objective function, c1 and c2 are constant values, T indicates a transpose operation, $\alpha_k$ is the step size in the $k^{th}$ iteration; and wherein using the backtracking projected line search to compute the step size satisfies a Armijo's condition of $$f(x + \alpha \hat{s}_k) \le f(x) + c_1 \alpha_k \nabla f(x)^T \hat{s}_k,$$

where $\hat{s}_k$ is the projected search direction in a $k^{th}$ iteration of the plurality of iterations, $f(x)$ is the current value of the objective function, c1 is a constant value, T indicates a transpose operation, ax is the step size in the $k^{th}$ iteration.

30. A method comprising:

receiving, via a user interface of a distributed computing system implementing a linear mixed model, a request to execute the linear mixed model on a dataset distributed across the plurality of worker machines, wherein the distributed computing system comprises a memory having computer-readable instructions stored thereon executed by a first processor associated with a main machine and a second processor associated with each of a plurality of worker machines that are configured to execute one or more same operations including executing distributed portions of a linear mixed model in parallel within; and responsive to receiving the request, iteratively deploying, by the distributed computing system, the linear mixed model across the plurality of worker machines including:

(A) computing, by the plurality of worker machines of the distributed computing system operating in parallel, a plurality of intermediate model performance values associated with distributed execution states of the linear mixed model and detect, based on one or more inconsistencies among the plurality of intermediate model performance values computed by different worker machines, numerical noise associated with distributed execution of the linear mixed model;

(B) responsive to detecting the numerical noise, determining, by the main machine, whether the numerical noise satisfies a convergence instability condition indicating that additional distributed iterations of the linear mixed model are capable of improving convergence of the linear mixed model;

(C) responsive to determining that the convergence instability condition is satisfied, adjust at least some of the one or more parameters associated with distributed execution of the linear mixed model to obtain one or more adjusted parameters that reduce the one or more inconsistencies among the plurality of intermediate performance values;

(D) setting, by distributed computing system, a flag value responsive to determining that the noise is not larger than the threshold;

(E) redistribute, by the main machine, the one or more adjusted parameters to the plurality of worker machines and execute an additional distributed iteration of the linear mixed model using the one or more adjusted parameters to cause a reduction of the numerical noise causing distributed computational instability associated with numerical noise;

(H);

(I) determining, by distributed computing system, whether a stopping criterion associated with convergence of the distributed execution of the linear mixed model is satisfied; and (J) responsive to determining that the stopping criterion is not satisfied, repeating, by distributed computing system, (B)-(E) and (H)-(I) with the adjusted output, wherein the adjusting of the at least some of the one or more parameters of the linear mixed model causes the stopping criterion to be satisfied based on the adjustment parameters, or responsive to determining that the stopping criterion has reached, outputting, by distributed computing system, an optimized value of the objective function.

* * * * *